US012158432B2

(12) United States Patent
Ong et al.

(10) Patent No.: US 12,158,432 B2
(45) Date of Patent: Dec. 3, 2024

(54) METHOD FOR MULTIVARIATE TESTING, DEVELOPMENT, AND VALIDATION OF A MATERIAL FOR AN ADDITIVE MANUFACTURING DEVICE

(71) Applicant: Stratasys, Inc., Eden Prairie, MN (US)

(72) Inventors: Joel Ong, San Francisco, CA (US); Christopher Prucha, San Francisco, CA (US); Steve Kranz, Oakland, CA (US); Eduardo González-Maldonado, San Francisco, CA (US)

(73) Assignee: Stratasys, Inc., Eden Prairie, MN (US)

( * ) Notice: Subject to any disclaimer, the term of this patent is extended or adjusted under 35 U.S.C. 154(b) by 852 days.

(21) Appl. No.: 17/173,174

(22) Filed: Feb. 10, 2021

(65) Prior Publication Data

US 2021/0247325 A1    Aug. 12, 2021

Related U.S. Application Data

(60) Provisional application No. 62/972,573, filed on Feb. 10, 2020.

(51) Int. Cl.
*G01N 21/88* (2006.01)
*B33Y 50/00* (2015.01)

(52) U.S. Cl.
CPC ......... *G01N 21/8851* (2013.01); *B33Y 50/00* (2014.12); *G01N 2021/8887* (2013.01)

(58) Field of Classification Search
None
See application file for complete search history.

(56) References Cited

U.S. PATENT DOCUMENTS

2018/0001568 A1* 1/2018 Sanchez Ribes ...... B33Y 30/00

FOREIGN PATENT DOCUMENTS

WO    WO-2019170286 A1 *  9/2019  ............. B29C 67/00

OTHER PUBLICATIONS

Machine translation of Ader et al. (Year: 2019).*

* cited by examiner

*Primary Examiner* — Matthew G Marini
(74) *Attorney, Agent, or Firm* — Run8 Patent Group, LLC; Peter Miller; Marissa Kohrman

(57) ABSTRACT

A method includes: accessing a first selection of a first test variable; based on the selection, photocuring a first test build by varying a value of the first test variable over a first set of test regions; accessing a first set of measurements of the first test build; calculating a target range of the first test variable based on the first set of measurements; accessing a second selection of a second test variable; based on the second selection, photocuring a second test build by varying a value of the second test variable over a second set of test regions while maintaining a target value of the first test variable within the target range of the first test variable; accessing a second set of measurements of the second test build; and calculating a second target range of the second test variable based on the second set of measurements.

12 Claims, 17 Drawing Sheets

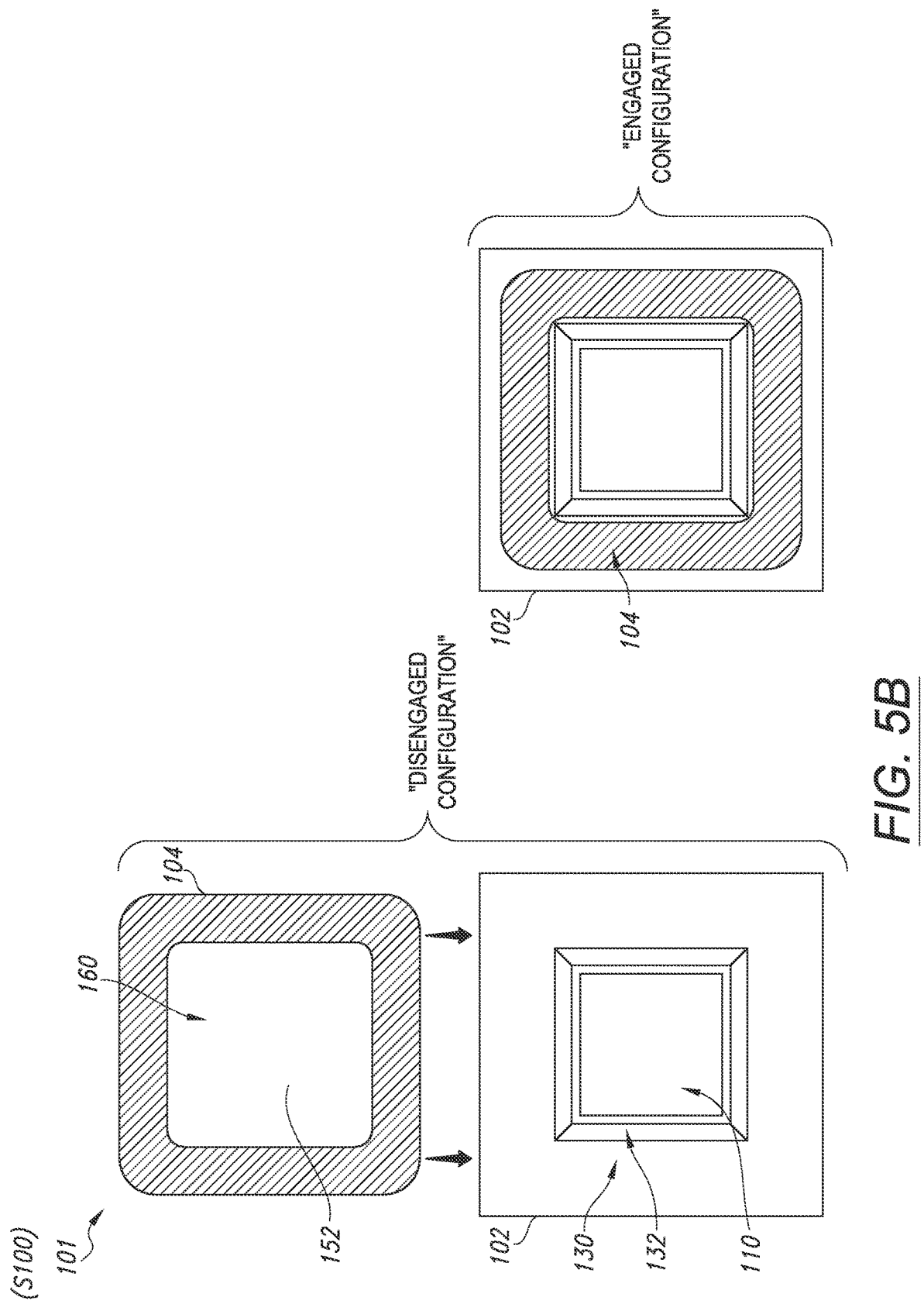

METHOD FOR MULTIVARIATE TESTING, DEVELOPMENT, AND VALIDATION OF A MATERIAL FOR AN ADDITIVE MANUFACTURING DEVICE

CROSS-REFERENCE TO RELATED APPLICATIONS

This application claims the benefit of U.S. Provisional Application No. 62/972,573, filed on 10 Feb. 2020, which is incorporated in its entirety by this reference.

TECHNICAL FIELD

This invention relates generally to the field of additive manufacturing and more specifically to a new and useful method for multivariate testing of a material for an additive manufacturing device 101 in the field of additive manufacturing.

BRIEF DESCRIPTION OF THE FIGURES

FIG. 5B is a schematic representation of one variation of the additive manufacturing device.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
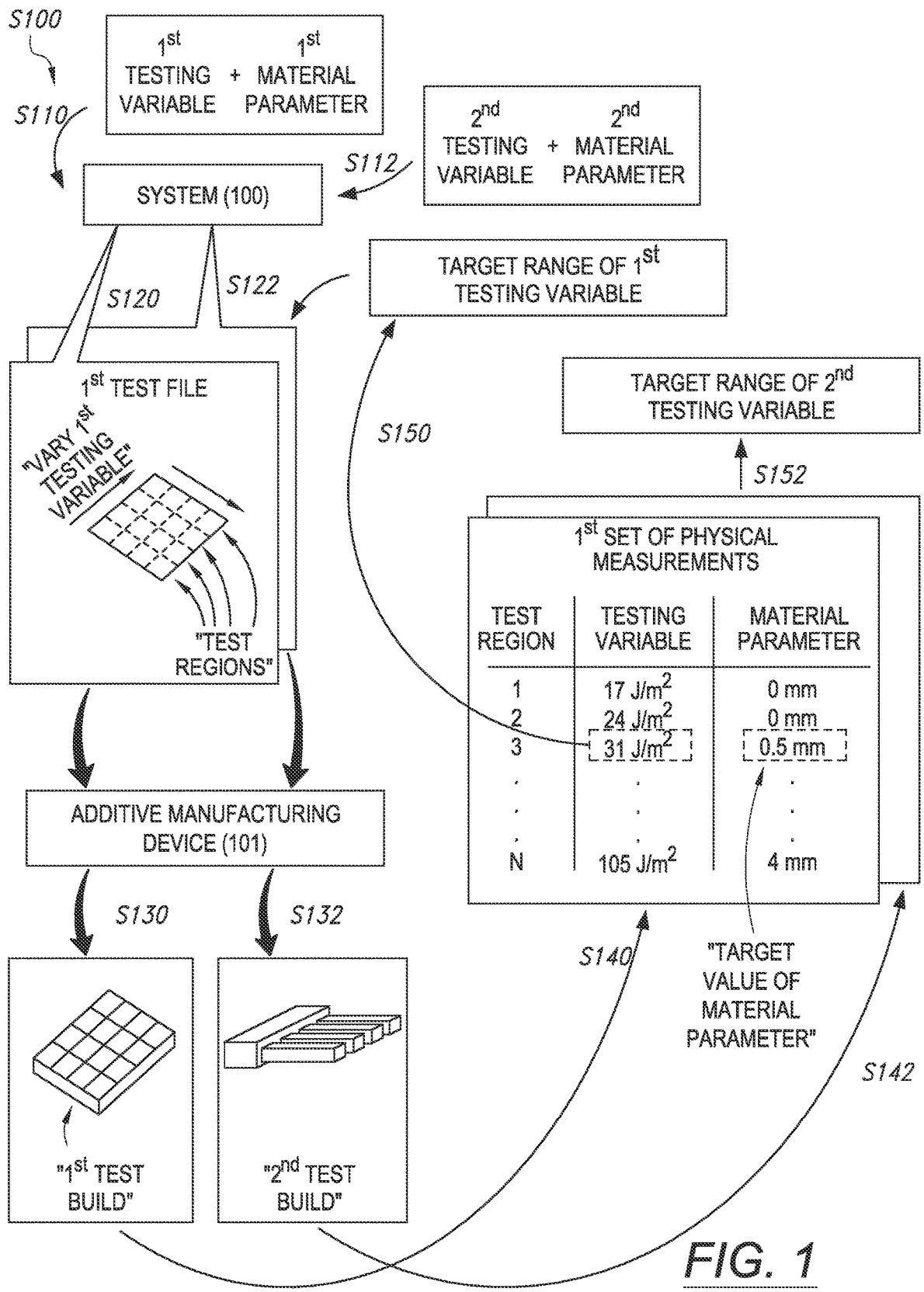
FIG. 1 is a flowchart representation of a method.

As shown in FIG. 1, a method S100 for evaluating a material for an additive manufacturing process includes: accessing a first selection of a first test variable and a first material parameter in Block S110; generating a first test file based on the first selection, the first test file defining a first set of test regions, each test region in the first set of test regions characterized by a value of the first test variable in Block S120; photocuring a first test build based on the first test file according to the value of the first test variable characterizing each test region in the first set of test regions in Block S130; accessing a first set of physical measurements of the first test build, the first set of physical measurements representing a value of the first material parameter for each test region in the first set of test regions in Block S140; calculating a first target range of the first test variable for the material based on the first set of physical measurements in Block S150; accessing a second selection of a second test variable and a second material parameter in Block S112; generating a second test file based on the second selection, the second test file defining a first target value of the first test variable within the first target range of the first test variable and defining a second set of test regions, each test region in the second set of test regions characterized by a value of the second test variable in Block S122; photocuring a second test build based on the second test file according to the value of the second test variable characterizing each test region in the second set of test regions and the first target value of the first test variable in Block S132; accessing a second set of physical measurements of the second test build, the second set of physical measurements representing a value of the second material parameter for each test region in the second set of test regions in Block S142; and calculating a second target range of the second test variable for the material based on the second set of physical measurements in Block S152.

Figure 2:
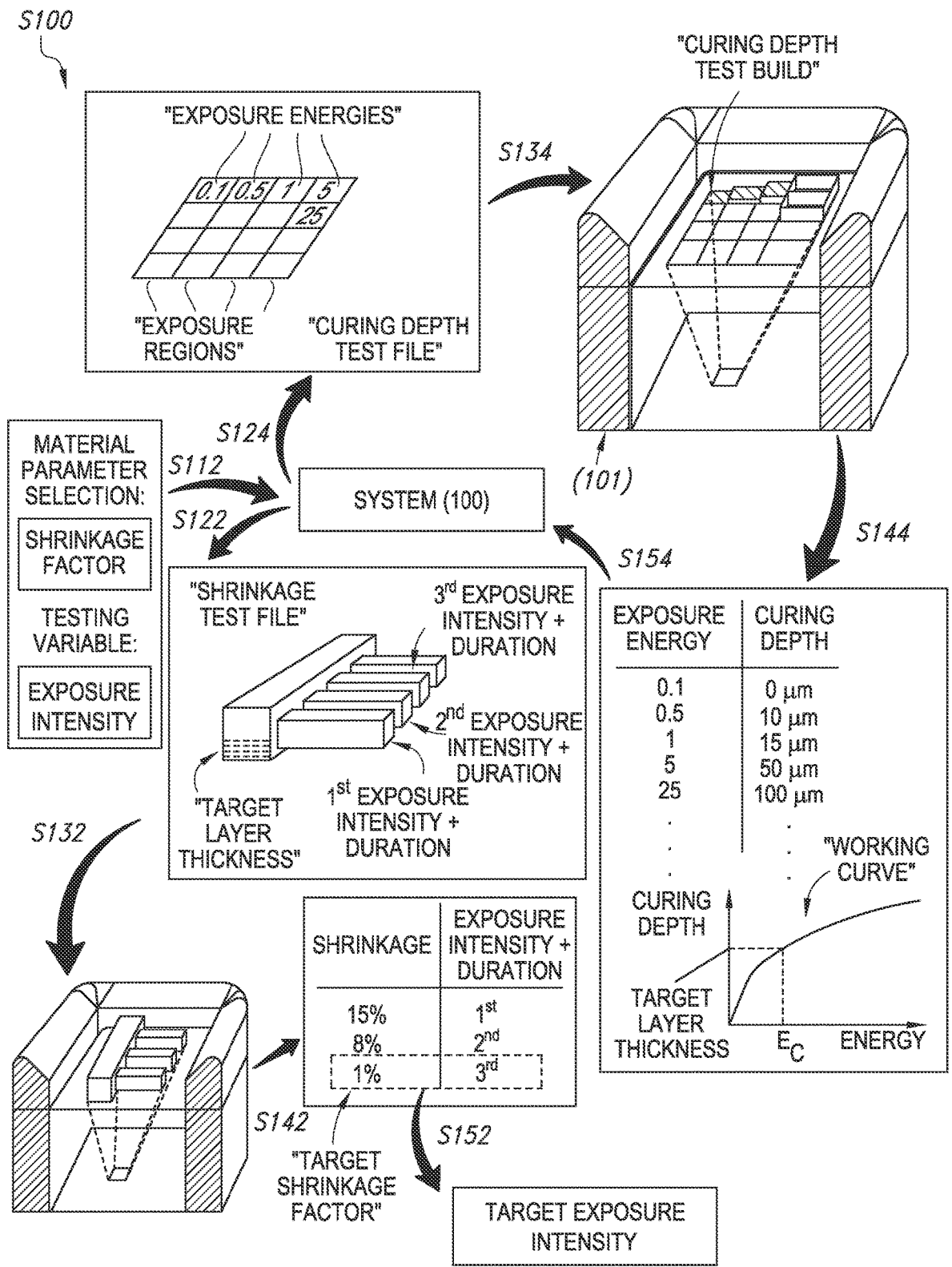
FIG. 2 is a flowchart representation of one variation of the method.

As shown in FIG. 2, one variation of the method S100 includes: generating a cure characterization test file defining a set of test regions arranged across a build area, each test region in the set of test regions characterized by a total exposure energy value in Block S124; photocuring a cure characterization test build by, for each test region in the set of test regions of the cure characterization test file, selectively exposing the material to a quantity of exposure energy corresponding to the total exposure energy value characterizing the test region in Block S134; accessing a first set of physical measurements representing a depth of cure for each test region in the set of test regions in Block S144; calculating a working curve of the material based on the first set of physical measurements of the cure characterization test build in Block S154; accessing a first selection of a first test variable and a first material parameter in Block S112; generating a second test file based on the first selection, the second test file defining a set of test regions, each test region in the set of test regions characterized by a value of the first test variable in Block S122; photocuring a second test build based on the second test file according to the value of the first test variable characterizing each test region in the set of test regions in Block S132; accessing a second set of physical measurements of the second test build, the second set of physical measurements representing a value of the first material parameter for each test region in the set of test regions in Block S142; and calculating a target range of the first test variable based on the second set of physical measurements in Block S152.

2. Applications

As shown in FIG. 1, a system-including a stereolithographic additive manufacturing device (hereinafter "the additive manufacturing device") and/or a remote computer system—can execute Blocks of the method S100: to facilitate development of novel material chemistries or adaptation of existing material chemistries for stereolithography via the additive manufacturing device 101; and to derive or characterize material parameters for effective additive manufacturing via the additive manufacturing device 101. More specifically, the system can execute an iterative material development process for a photocurable resin- or material-under-test (hereinafter "the material"), wherein each step of the process includes: selection of a set of test variables (independent or interdependent variables) and a set of material parameters dependent on the test variable; generating a test file (e.g., a representation of three-dimensional geometry and accompanying metadata) based the selected set of test variables, material parameters, and known characteristics of the material (in uncured, cured, and post-cured states); photocuring a test build based on the test file via the additive manufacturing device 101; accessing a set of physical measurements of the test build or recorded during the photocuring process of the test build that represent the set of material parameters; and calculating target values for the selected set of test variables based on the set of physical measurements. Thus, the system can facilitate resource-efficient development of this new material for use in the additive manufacturing device 101 within a short development cycle and with a small volume (e.g., ounces) of this material.

Additionally, the system can define a development flow of test files for the aforementioned iterative material development process that establishes an order of tests to speed development of the material and derivation of device settings during the iterative material development process. For example, the system can execute an iterative material development process that first characterizes basic photocuring behavior of the material (e.g., critical energy, working curve, target exposure energy, viable range of layer thicknesses), then characterizes the relationship between the exposure energy profile (i.e., the intensity at which and the duration for which electromagnetic energy is projected toward the uncured material) and a target material parameter (e.g., elongation at break, elastic modulus, surface finish), and finally derives dimensional compensation parameters (e.g., scaling factors) to ensure dimensional accuracy of builds manufactured from the material. At each stage in the development flow, the system can apply a set of development criteria to the results of each test to determine whether to proceed to the next step established in the development flow or to halt the development process and prompt chemical reformulation of the material.

Generally, the system defines development flows that first characterize the working curve of the material by generating and building a cure characterization test file (a first test file) before characterizing a target exposure energy profile (defining at least a target exposure intensity and corresponding target exposure duration) relative to a target material parameter by generating and building a second test file. Upon characterization of the working curve of the material via the cure characterization test file, the system can then generate a second test file that exposes select regions of the build to an exposure energy (i.e., energy per unit area or energy density) that is greater than a target exposure energy corresponding in a target layer thickness. Thus, each step of the iterative material development process is informed by the results of the previous step, thereby refining the set of device settings to enable additive manufacturing with the material within only a few test builds (assuming no reformulations are required).

The method S100 can be executed in part by an additive manufacturing device 101 capable of executing a digital light process (hereinafter "DLP") or a continuous digital light process (hereinafter "CDLP") to manufacture a progression of three-dimensional structures (hereinafter "test builds") based on a corresponding progression of three-dimensional computer-aided design files, associated metadata, and device settings (hereinafter "test files") that define the geometry of the test builds and a set of test regions within the geometry within which the additive manufacturing device 101 can according to a test-region-specific set of test variables. Therefore, the additive manufacturing device 101 is capable of modifying one or more of these test variables across a set of test regions in the test build according to specifications of the test file. For example, the additive manufacturing device 101 is configured to modify the exposure energy profile across different areas of the same layer. By repeatedly generating layers with variable build parameters, the additive manufacturing device 101 can photocure multiple three-dimensional test regions of a test build, each according to a unique set of test variables (or build parameters). For some test variables, the test file can define three-dimensional test regions characterized by any three-dimensional volume within the test build geometry, thereby facilitating space- and material-efficient testing geometries for each test build of the iterative material development process.

For example, in order to modify the exposure energy profile on an intralayer basis, the additive manufacturing device 101 includes a projection system configured to irradiate the material (e.g., via projected electromagnetic radiation within an emissive spectrum) at an interface located at the surface of a build window of the additive manufacturing device 101 (hereinafter "the build interface"). In response to metadata stored in the test file and corresponding to particular test regions of the test file, the projection system is configured to modulate the exposure energy profile (e.g., via a digital micromirror device) incident to selective regions of the build interface within a single layer of the build. For example, the system can generate a test file specifying a set of exposure intensities and exposure duration combinations, each combination corresponding to a separate region of the build interface during photocuring of a particular layer. Thus, the system can test the chemical/physical response of a material to various exposure durations and/or exposure intensities within one build instead of over many separate builds each characterized by different exposure intensities and/or exposure durations.

Generally, prototype materials and materials under development may be relatively expensive per unit volume and may be more viably produced in small batches. Therefore, by generating a progression of test builds that include many test regions characterized by variable build parameters, the system can aid a user in rapidly and systematically identifying target device settings that satisfy design goals for the material while utilizing a minimal volume of the material, thereby enabling successful deployment with minimal upfront development cost. Additionally, the system can characterize the viability of the material for manufacturing via the additive manufacturing device 101 towards specific end-use applications (e.g., specific geometries, specific regulatory or industry standards).

In one variation, the system can first generate a cure characterization test file and photocure a corresponding cure characterization test build in order to establish a working curve for a material. The working curve is a fundamental property of a photocurable material that establishes the material's critical energy and its cure depth corresponding to a range of exposure energy levels. When photocuring the cure characterization test file, the system exposes various test regions of the material at the build interface to different levels of exposure energy (per unit area) by modulating the exposure energy profile across the build interface (e.g., in a grid pattern). In one implementation, the system can measure the depth of cure of each region to generate depth of cure data relating the exposure energy of regions in the depth of cure test build to the depth of cure of those regions. Alternatively, the additive manufacturing device 101 can access these depth of cure data (via an integrated depth sensor), measured by a user manually (via calipers) or via a separate device. Once these depth of cure data have been obtained, the system can access these data and fit a working curve to these data.

In one example development flow, once the system has calculated the working curve of the material, assuming the properties of the working curve satisfy a set of development criteria (e.g., based on the target operating range of the additive manufacturing device and a target layer thickness resulting in desired accuracy and quality), the system proceeds in evaluating the material by generating a tensile functional property test file and photocuring a corresponding tensile functional property test build in order to test material parameters such as the elastic modulus of the material, the elongation at break of the material, and/or, the ultimate tensile strength of the material in response to variations in the exposure profile applied to the material during the additive manufacturing process. The system can photocure a tensile functional property test build that includes a set of gage-and-shoulder tensile test specimens, each exposed to a distinct exposure profile during the additive manufacturing process. Upon completion of the tensile mechanical test build, the system can access physical measurements corresponding to each gage-and-shoulder tensile test specimen and relate these physical measurements to the exposure profiles applied to each test specimen. The system can then select a target exposure profile that results in the target tensile mechanical properties for the material in its post-cured state. Therefore, by generating this cure characterization test file and tensile functional property test file and photocuring corresponding test builds, the system can efficiently calculate a target exposure profile for a given formulation of the material and relative to a prioritized material parameter while executing only two builds at the additive manufacturing device 101 (where one of these builds includes only a single layer).

In another example development flow, once the system has calculated the working curve of the material, the system proceeds in evaluating the material by generating a shrinkage test file and photocuring a shrinkage test build based on a target layer thickness and the working curve of the material. By photocuring the shrinkage test build, the system can characterize the response of the material (e.g., in terms of post-cure bulk shrinkage and/or warpage) to various exposure energy profiles (e.g., combinations of exposure intensity and exposure duration) all resulting in the given target layer thickness (according to the working curve). The system can photocure a shrinkage test build that includes a series of horizontal beams extending from a common block of material, each beam is exposed to a different exposure energy profile for each of its constituent layers. In one implementation, upon completion of the shrinkage test build, the system can detect subsequent shrinkage and/or warpage of each beam to generate shrinkage data for the material. Alternatively, the system can access shrinkage data collected by the user, who may measure the shrinkage and/or warpage of each beam manually or via a separate device. The system can then select an exposure profile that results in a minimum amount of shrinkage and/or warpage of the material in its post-cured state.

The system can generate additional test files and photocure corresponding test builds for evaluating the response of other material parameters to changes in build parameters of the additive manufacturing device 101 when photocuring the material. For example, the system can generate test files and photocure test builds to test the response of the elastic modulus of the green material, the surface finish of the post-cure material, and/or the dimensional accuracy of the post-cure material to changes in the exposure profile, changes in layer thickness, and/or to changes in any other test variable.

3. Terminology

Generally, the system in cooperation with the additive manufacturing device 101 can photocure test builds according to Blocks of the method S100. However, the additive manufacturing device 101 photocures these three-dimensional test builds on a layer-by-layer basis by executing a number of successive "build cycles" in an "additive manufacturing process." Therefore, a single build cycle refers to the steps executed by the additive manufacturing device 101 to form a single layer of the test build, which are described in further detail below.

Generally, the term "photocure," as utilized herein, does not imply full chemical crosslinking within a photopolymer material and instead may refer to partial photopolymerization of the material prior to a heat- or UV-initiated post-curing step.

Generally, certain material parameters or properties are referred to herein in relation to a "green state" of the material or as a "green" material parameter or property. These green parameters refer to the state of the material after initial photopolymerization by the additive manufacturing device 101 but prior to a heat- or UV-initiated post-curing step.

Generally, certain material parameters or properties are referred to herein in relation to a "post-cure state" of the material or a "post-cure" material parameter or property. These post-cure properties refer to the state of the material after the heat- or UV-initiated post-curing step and, therefore, reflect the final properties of the material upon completion of the additive manufacturing process.

Generally, the system can execute multiple iterations of the iterative material development process S100 described herein. Each "iteration" of the iterative material development process refers to: accessing a selection of a test variable and a material parameter in Block S110; generating a test file based on the selection in Block S120; photocuring a test build based on the test file in Block S130; accessing a set of physical measurements of the test build in Block S140; and calculating a target range of the test variable and/or characterizing a corresponding range of the material parameter in Block S150. Thus, the iterative material development process S100, as a whole, can include any number of iterations of these Blocks as dictated by the development flow of the iterative material development process.

4. Additive Manufacturing Device

Figure 3:
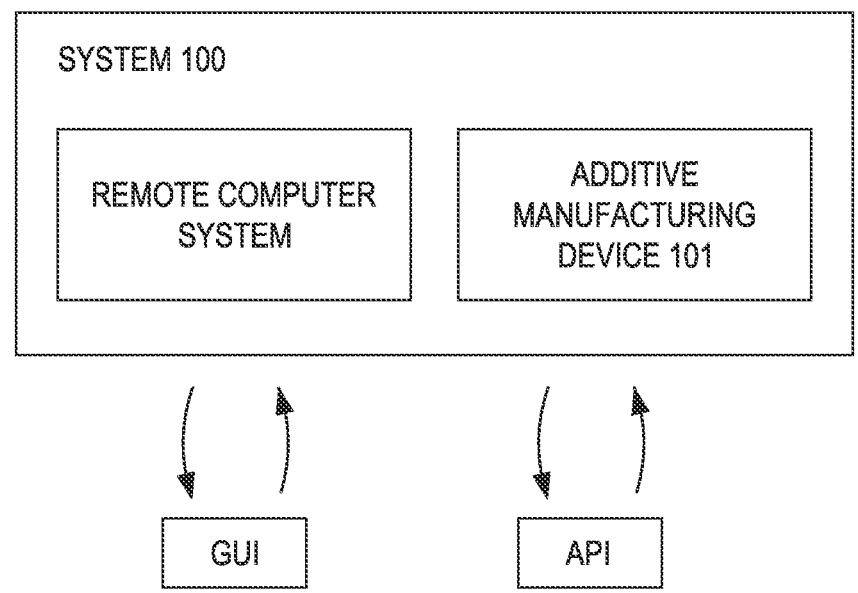
FIG. 3 is a schematic representation of a system.

As shown in FIG. 3, the system 100 cooperates with the additive manufacturing device 101 described below to execute Blocks of the method S100. However, the system can cooperate with any stereolithographic additive manufacturing device 101 capable of varying the independent test variables, as specified by Blocks of the method S100, between layers of a test build (e.g., by varying layer thickness between layers of a test build) and/or within layers of a test build (e.g., by varying exposure energy, intensity, and/or duration between regions of the same layer) according to the test files generated by the system. Therefore, the additive manufacturing device 101 described below is one example of an additive manufacturing device 101 capable of cooperating with the system to execute Blocks of the method S100.

Figure 4A:
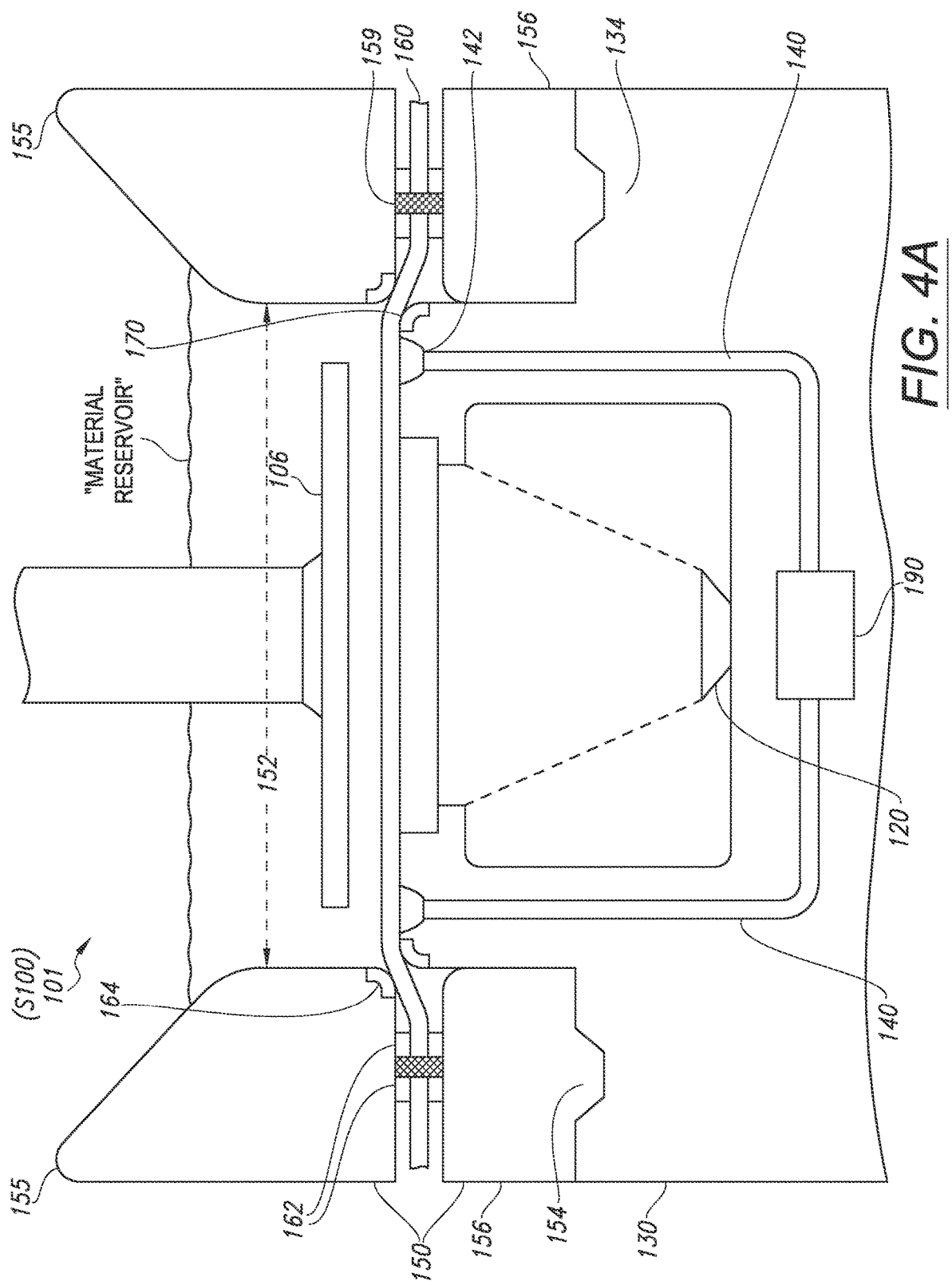
FIG. 4A is a schematic representation of one variation of an additive manufacturing device.

As shown in FIG. 4A, the additive manufacturing device 101 includes two subassemblies of electromechanical components that, when engaged in an engaged configuration, can execute a "bottom-up" DLP process. Generally, the additive manufacturing device 101 includes a base assembly 102 and a tray assembly 104. A user may: assemble the tray assembly 104 by inserting a separation membrane 160 into the tray structure 150; and engage the tray assembly 104 with the base assembly 102 before the additive manufacturing device 101 executes an additive manufacturing process to photocure test builds specified by the system. The additive manufacturing device 101 can then execute Blocks of the method S100 via an imbedded computational device running computer code (hereinafter the "controller"), which electronically actuates the build platform 106 (e.g., via a linear actuation system) and controls the projection system 120 and the pressure regulation system 190 to selectively cure volumes of material and to separate these cured volumes of material from the build window 110 and separation membrane 160. Additionally, after completion of a test build, the additive manufacturing device 101 can automatically extract sets of physical measurements describing the test build via an integrated sensor suite, thereby obviating manual physical measurement of the completed test build.

The additive manufacturing device 101, while photocuring layers of a test build, proceeds through multiple physical arrangements of the components (e.g., a set of physical, three-dimensional objects) from the material contained within the tray assembly 104. In a lamination phase, the additive manufacturing device 101 reduces the pressure (i.e., draws a vacuum/evacuates fluid from) in the interstitial layer between the separation membrane 160 and the build window 110, thereby fully laminating the separation membrane 160 against the build window 110 and preventing formation of bubbles or wrinkles that may disrupt the reference surface for the additive manufacturing device 101. During and/or after the lamination phase, the additive manufacturing device 101 can photocure a selective volume of material above the laminated surface of the separation membrane 160. After photocuring a layer of a test build, the additive manufacturing device 101 can execute a separation process including a pressurization phase, a retraction phase, and a relamination phase. In the pressurization phase the additive manufacturing device 101 injects fluid into the interstitial region, thereby generating separation between the separation membrane 160 and the build window 110 in order to reduce adhesion forces (e.g., Stefan adhesion, suction forces) between the newly cured layer of a test build and the build window 110. In the retraction phase, the additive manufacturing device 101 actuates the build platform 106 upward and away from the build window 110: to separate the separation membrane 160 from the build window 110; to peel the separation membrane 160 from the newly cured layer of a test build; and to make space to photocure a successive layer of material. In the relamination phase, the additive manufacturing device 101 evacuates fluid from the interstitial region in order to peel the separation membrane 160 from the newly cured layer of the test build and to relaminate the separation membrane 160 against the build window 110 in preparation for curing a successive layer of the test build. Thus, the additive manufacturing device 101 can repeat this process cycle to cure successive layers of the material, thereby constructing a three-dimensional test build.

As is further described below, the additive manufacturing device 101 can vary any aspect of the above-described processes between layers of a test build and can vary a subset of these aspects within a single layer of a test build (e.g., between different regions within a single layer of a test build) according to a test file generated by the system.

4.1 Base Assembly

The additive manufacturing device 101 includes a base assembly 102, which acts as the first assembly resembling a three-dimensional printer. The base assembly 102 includes a projection system 120, a window platform 132, a build window 110, a fluid distribution port 140 and/or a fluid distribution channel 142, a gasket system, a pressure regulation system 190, a tray seat 130, a build platform 106, and a controller. The base assembly 102 can be a free-standing structure that may be placed on a level surface for best printing results. The free-standing structure of the base assembly 102 links the aforementioned components in a calibrated arrangement that ensures consistent alignment between the projection system 120 and the build window 110 and parallelism between the reference plane of the build window 110, the surface of the retractable build platform 106, and the focal plane(s) of the projection system 120. The structure of the base assembly 102 can be manufactured from any rigid material that does not significantly deform under the weight of the base assembly 102 or the stresses involved during repetitive build cycles.

The base assembly 102 can also include a build chamber, into which the tray assembly 104 may be loaded (e.g., via engagement with the tray seat 130), and a hatch to provide access to this build chamber. The base assembly 102 can further include systems configured to control the environment within the build chamber (e.g., such as an auxiliary pressure regulation system 190 and/or a set of heating elements).

4.1.1 Projection System

The projection system 120 is upward facing, is housed in the base assembly 102, and can include one or more projectors configured to project electromagnetic radiation in an emissive spectrum, which can include the ultraviolet (hereinafter "UV"), visible, or near infrared (hereinafter "NIR")

spectrum. The projection system can emit electromagnetic radiation in one or more wavelength bands tuned to the chemical and physical properties of the material and its specific curing process. For example, the projection system 120 (e.g., a digital projection system) can project electromagnetic radiation in an emissive spectrum of 300-nanometer to 450-nanometers. The projection system 120 is electrically coupled to the controller; receives potentially software-modified frames corresponding to full or partial cross-sections of a three-dimensional model of a test build; and projects electromagnetic radiation through the build window 110 and separation membrane 160 in the engaged configuration (and during the photocuring phase) to selectively photocure volumes of the material according to build parameters and the received frames.

In one variation, the additive manufacturing device 101 can include a projection system 120, which further includes a set of light sources, such as projectors or other electromagnetic emitting devices. In this variation, each irradiation source of the projection system 120 can define a projective area within the build window 110 in order to maintain a higher resolution across the build window 110 via tiling or stitching techniques. Additionally or alternatively, each light source can define a separate emissive spectrum enabling the projection system 120 to project electromagnetic radiation within multiple combinations of spectral bands.

In one variation, the projection system 120 includes a UV or near-UV laser and scans (e.g., as a raster) a laser beam across the build window 110 according to frames received from the controller in order to selectively photocure a volume of material located over the separation membrane 160.

The additive manufacturing device 101 can adjust the total exposure energy of electromagnetic radiation within the emissive spectrum, as well as the exposure intensity and exposure duration of this electromagnetic radiation, incident to the material during the photocuring phase of the additive manufacturing process.

4.1.2 Window Platform

Generally, the window platform 132 extends upwards from a tray seat 130 of the base assembly 102 and is configured to align within a tray aperture 152 of the tray assembly 104 when the additive manufacturing device 101 is in the engaged configuration. The window platform 132 is a rigid structure that encompasses the projection system 120 and defines an opening above the upward facing projection system 120 that is spanned by the build window 110. The upper surface of the window platform 132 defines a horizontal reference plane which is coincident with the upper surface of the build window 110 and the first focal plane of the projection system 120. The additive manufacturing device 101 can include a window platform 132 of a shape that: corresponds to a shape of a tray aperture 152; enables engagement with the separation membrane 160; and is configured to define fluid distribution ports 140 and/or fluid distribution channels 142 around the build window 110 and within the interstitial region. For example, the upper surface of the window platform 132 can define a circular shape, a rectangular shape, or any other shape depending on the target shape of the tray aperture 152. In an additional example, the additive manufacturing device 101 can include a window platform 132 of any size larger than the build region of the additive manufacturing device 101 and/or the dimensions of builds to be manufactured by the additive manufacturing device 101. The additive manufacturing device 101 can include a window platform 132 with filleted corners and edges around the upper surface of the window platform 132 to prevent tearing of the separation membrane 160 as it is tensioned over the window platform 132.

The window platform 132 defines an opening that is spanned or partially spanned by the build window 110. Generally, the shape and size of the opening defined by the window platform 132 roughly corresponds with the shape and size of the upper surface of the build window 110 in order to maximize utilization of the build region of the additive manufacturing device 101.

4.1.3 Build Window

The build window 110 is mounted to the window platform 132 such that the upper surface of the build window 110 is approximately flush with the upper surface of the window platform 132 and further defines the horizontal reference plane for builds manufactured in the additive manufacturing device 101. The build window 110 is arranged above the projection system 120 and aligned with the projection area of the projection system 120 such that the focal plane of the projection system 120 coincides with the upper surface of the separation membrane 160 laminated over the build window 110. Generally, the build window 110 is substantially transparent (e.g., exhibiting greater than 85% transmittance) to the emissive spectrum of the projection system and thus passes electromagnetic radiation output by the projection system 120 into the material above the build window 110 and separation membrane 160. The build window 110 also functions as a rigid support and reference surface for the separation membrane 160 and a layer of material arranged thereover. The build window 110 is statically mounted to a base assembly 102, via the window platform 132, that can include the projection system 120, the build platform 106, the fluid distribution port 140, the pressure regulation system 190, and/or the build chamber to ensure repeatable, accurate alignment between the build window 110 and the rest of the base assembly 102. The interface between the rigid window platform 132 and the build window 110 is also gas-impermeable such that a pressure gradient, such as 300 kilopascals, can be sustained across the build window 110.

The base assembly 102 can include a build window 110 manufactured from a pane of transparent, rigid glass, such as amorphous/silicate or crystalline/ceramic glass. In particular, the build window 110 can be both transparent to ultraviolet (or other) light output by the projection system 120 and can be substantially rigid, hard, and temperature-stable to form a robust, flat reference surface that supports the separation membrane 160 and that may exhibit minimal deflection or deformation during multiple build cycles, thereby yielding high and consistent build quality.

In one variation, the base assembly 102 can include a build window 110 that is transmissive to infrared (hereinafter "IR") radiation such that a thermographic sensor positioned below the build window 110 can accurately calculate the temperature of the material during a during the photocuring phase of the build cycle.

4.1.4 Fluid Distribution Ports

The base assembly 102 includes one or more fluid distribution ports 140 configured to fluidically (i.e. pneumatically or hydraulically) couple the pressure regulation system 190 to the interstitial region between the separation membrane 160 and the build window 110, thereby enabling the pressure regulation system 190 to inject and/or evacuate fluid from the interstitial region while the additive manufacturing device 101 is in the engaged configuration. The fluid distribution ports 140 can therefore be located within a gasket system that forms a seal between the base assembly 102 and the tray assembly 104 and, more specifically, between the build window 110 and the separation membrane 160. Each fluid distribution port 140 can define an opening that is fluidically coupled to the pressure distribution system 100 to enable the additive manufacturing device 101 to adjust the pressure within the interstitial region via the pressure distribution port by injecting and/or evacuating fluid from the fluid distribution ports 140. In one implementation, the additive manufacturing device 101 includes an inlet fluid distribution port 140 and an outlet fluid distribution port 140, which provides an inlet for fluid entering the interstitial region and an outlet for fluid evacuating from the interstitial region respectively. Alternatively, the base assembly 102 includes a single fluid distribution port 140, which is configured with the pressure regulation system 190 as both an outlet and an inlet for fluid in the interstitial region. In another implementation, the base assembly 102 can include additional fluid distribution ports 140 arranged throughout the interstitial region in order to reduce asymmetrical fluid flow from one side of the interstitial region to another.

4.1.5 Fluid Distribution Channel

In one variation, the base assembly 102 includes a fluid distribution channel 142 intersecting the fluid distribution ports 140 and configured to distribute fluid evenly throughout the interstitial region. More specifically, the base assembly 102 can include a fluid distribution channel 142 configured to reduce asymmetrical fluid flow relative to the build window 110 and the separation membrane 160 by distributing fluid from a fluid distribution port 140 throughout the interstitial region. Thus, when fluid is injected into or evacuated from the interstitial region, the entire region is pressurized and/or depressurized substantially simultaneously, thereby preventing bubble formation in the separation membrane 160 or uneven separation of the separation membrane 160 from a test build during the retraction and/or relamination phase.

In one implementation, the fluid distribution channel 142 is integrated within the window platform 132 supporting the build window 110 and defines a channel inset into the upper surface of the rigid window platform 132. In this implementation, the fluid distribution channel 142 is arranged circumferentially around the perimeter of the build window 110 and intersects an inlet fluid distribution port 140 and an outlet fluid distribution port 140 fluidly coupled to the pressure regulation system 190. Thus, the base assembly 102 can include a fluid distribution channel 142 circumscribing the build window 110 and configured to distribute fluid evenly in the interstitial region.

However, the base assembly 102 can include a fluid distribution channel 142 defining any path throughout the interstitial region that reduces asymmetrical fluid flow within the interstitial region.

4.1.6 Pressure Regulation System and Pressure Chambers

Figure 6:
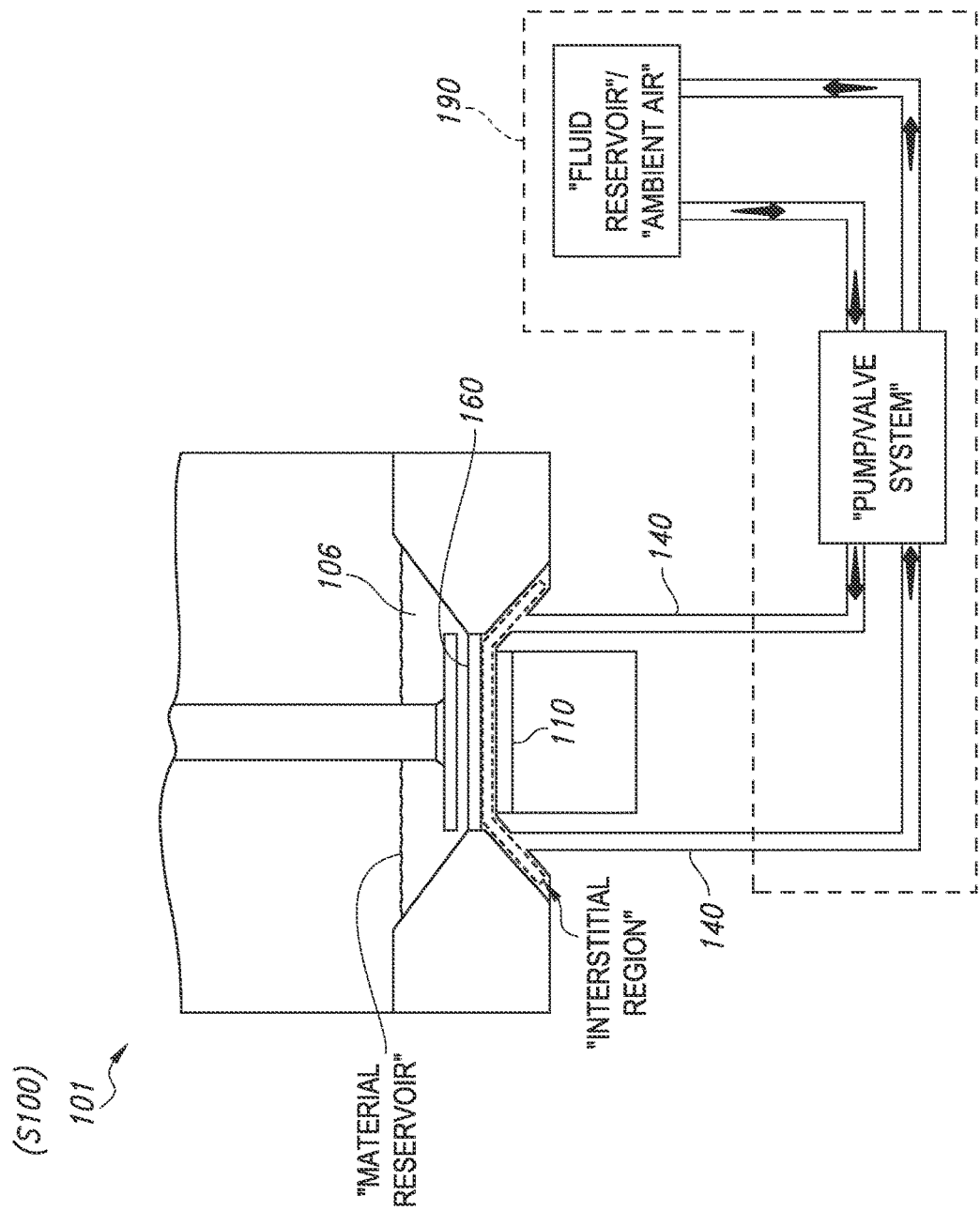
FIG. 6 is a schematic representation of one variation of the additive manufacturing device.

Generally, as shown in FIG. 6, the base assembly 102 can include a pressure regulation system 190 configured to pressurize and/or depressurize by injecting and/or evacuating fluid from the interstitial region during the lamination, pressurization, and relamination phases of the additive manufacturing process. More specifically, the base assembly 102 can include a pressure regulation system 190 that is: fluidically coupled to the fluid distribution port 140; configured to inject fluid into the interstitial region to separate the separation membrane 160 from the build window 110 in the engaged configuration and during a pressurization phase; and configured to evacuate fluid from the interstitial region to laminate the separation membrane 160 to the build window 110 in the engaged configuration and during a lamination phase.

The pressure regulation system 190 can include a pump (e.g., a diaphragm pump) and a set of electromechanical valves connected by a set of tubes to the fluid distribution ports 140. More specifically, the pressure regulation system 190 can include a pump fluidically coupled to a set of two electromechanical valves configured to actuate in response to commands from the additive manufacturing device 101 and direct fluid flow through the pump into the interstitial region or out of the interstitial region based on a current phase of the build cycle.

In one implementation, the pressure regulation system 190 includes a set of electronically actuated valves configured to regulate flow between a compressed fluid supply line (e.g., a compressed air supply line in the building housing the system 100) and a central vacuum line. The additive manufacturing device 101 can, therefore, be connected—such as via external ports—to the compressed fluid supply line and the central vacuum line.

In another implementation, the pressure regulation system 190 includes a compressor system 100 (e.g., a centrifugal compressor) and an external air port and is configured to: intake ambient air via the external air port; compress this ambient air; and inject this ambient air into the interstitial region. The pressure regulation system 190 can also evacuate air from the interstitial region via the compressor and the external air port by running the compressor system 100 in reverse. Alternatively, the pressure regulation system 190 is fluidly coupled to a fluid reservoir (e.g., a tank containing an inert fluid). Thus, the additive manufacturing device 101 can inject fluid from the fluid reservoir into the interstitial region or evacuate this fluid into the fluid reservoir via the pressure regulation system 190.

In yet another implementation, the base assembly 102 can include a compressor system 100 and/or a system 100 of electronically actuated valves configured to draw fluid from the pressurized build chamber (e.g., above the surface of the material reservoir contained in the build tray) in order to pressurize the interstitial region in the pressurization phase. Likewise, the additive manufacturing device 101 can evacuate fluid from the interstitial region back into the build chamber during the relamination phase and/or the lamination phase. Thus, in this implementation, the additive manufacturing device 101 can operate independently from external sources of a working fluid for pressurization or depressurization of the interstitial region.

Additionally or alternatively, the base assembly 102 can include a second pressure regulation system 190 configured to control the pressure of the build chamber independent from the pressure of the interstitial region. The additive manufacturing device 101 can coordinate the first pressure regulation system 190 and the second pressure regulation system 190 to improve separation (e.g., reduce separation forces and increase separation speed) of the separation membrane 160 from the cured material layer of a test build.

The pressure regulation system 190 can maintain a maximum operating inflation differential pressure up to or exceeding 300 kilopascals and can pull a vacuum (e.g., a maximum operating deflation pressure) greater than 200 kilopascals. These pressures are sufficient to adequately separate the separation membrane 160 from the build window 110 in the pressurization phase and to laminate the separation membrane 160 to the build window 110 in the lamination and/or the lamination phase. However, the pressure regulation system 190 can maintain alternative operating differential pressures based on the volume of the interstitial region and the force exerted on the interstitial region by the separation membrane 160 due to the particular elasticity and thickness of the separation membrane 160.

4.1.7 Tray Seat

The base assembly 102 can define a tray seat 130 around the base of the window platform 132 with a surface offset below the upper surface of the window platform 132 such that the window platform 132 protrudes upwards from the center of the tray seat 130. The tray seat 130 defines a surface with a high degree of parallelism with the reference plane defined by the window platform 132. Additionally, the vertical offset between the tray seat 130 and the reference plane can be calibrated and/or constructed with a low tolerance such that, when the tray assembly 104 is seated at the tray seat 130 of the base assembly 102 in the engaged configuration, the separation membrane 160 is precisely positioned relative to the build window 110. In one variation, the additive manufacturing device 101 includes a tray seat 130 and tray assembly 104 tolerance stack that positions the separation membrane 160 slightly above (e.g., less than 1 millimeter above) the build window 110 when there is no pressure gradient across the separation membrane 160. In another variation, the additive manufacturing device 101 defines a tray seat 130 and tray assembly 104 tolerance stack that positions the upper surface of the window platform 132 and/or build window 110 such that these surfaces protrude into the tensioned separation membrane 160 while the additive manufacturing device 101 is in the engaged configuration, thereby automatically laminating the separation membrane 160 against the build window 110.

The tray assembly 104 can define a set of registration features 154 corresponding to complimentary reference features 134 arranged on the tray seat 130 of the base assembly 102. Therefore, in the engaged configuration, the registration features 154 can constrain the tray assembly 104 relative to the base assembly 102. In one implementation, the reference features 134 of the base assembly 102 and the registration features 154 of the tray assembly 104 are configured to kinematically align the tray assembly 104 relative to the base assembly, thereby maintaining a precise offset between the separation membrane 160 and the build window 110 and/or preventing movement of the tray assembly 104 relative to the base assembly 102 during the build cycle. In another implementation, the base assembly 102 can include imbedded magnetic features underneath the tray seat 130 in order to bias the tray assembly 104 downward onto the reference features 134 of the tray seat 130. Alternatively, the base assembly 102 can include a set of mechanical clamps or screws in order to seat the tray assembly 104 at the tray seat 130 of the base assembly 102.

4.1.8 Reference Features

Generally, the reference features 134 defined by the tray seat 130 are configured to correspond to matching features in the tray assembly 104 and to thus align the tray assembly 104 with the base assembly 102. More specifically, the base assembly 102 can define positive reference features 134 or negative reference features 134 on the tray seat 130. Alternatively, the base assembly 102 can include reference features 134 that are separate components configured to install onto the tray seat 130. In combination with a biasing force, such as a magnetic force between corresponding magnetic features in the base assembly 102 and tray assembly 104, mechanically applied force securing the tray assembly 104 to the base assembly 102, and/or the force of gravity pulling the tray assembly 104 downward onto the base assembly 102, the reference features 134 kinematically constrain the tray assembly 104 relative to the base assembly 102 in all six degrees-of-freedom. Thus, corresponding reference features 134 defined in the tray seat 130 and in the tray assembly 104 can repeatably and accurately align the tray assembly 104 with the base assembly 102 when the tray assembly 104 is engaged with the base assembly 102.

4.1.9 Build Platform

Generally, the base assembly 102 also includes a vertically mobile build platform 106 to which a first layer of each test build adheres and from which the test build is suspended toward the build window 110 during the build cycle. More specifically, the base assembly 102 can include a build platform 106 defining a planar surface opposite and substantially parallel to the upper surface of the build window 110; and a linear actuation system (including a single linear actuator or multiple timed linear actuators) configured to vertically translate the build platform 106 relative to the build window 110. In one implementation, the additive manufacturing device 101 can include a build platform 106 defining negative features, such as channels or through holes to improve the flow of material out from under the build platform 106 during advancement of the build platform 106 into the material reservoir and to facilitate the removal of a test build from the build platform 106 after completion of the test build.

The build platform 106 is a vertically actuating surface opposite the build window 110. The additive manufacturing device 101 can include a linear actuation system (with increments as small as 0.1 microns) mechanically coupled to the build platform 106. Additionally, during actuation of the linear actuation system, the controller: can track forces applied by the linear actuation system to the build platform 106 (e.g., based on a current draw of the linear actuation system or by sampling a force sensor, strain gauge, or load cell coupled to the build platform 106); and implement closed-loop techniques to control movement of the linear actuation system in order to achieve a particular distribution of separation forces between the newly cured layer of a test build and the separation membrane 160 (e.g., to sweep this separation force along a predefined force profile once per layer). Thus, during the build cycle the linear actuation system lowers the build platform 106 to specific heights above the separation membrane 160 such that photocured material adheres to the build surface of the build platform 106 facing the window. As the additive manufacturing device 101 selectively cures successive layers of a test build according to the additive manufacturing process, the additive manufacturing device 101 can retract the build platform 106 upward by a first distance in order to separate the current layer of the test build from the separation membrane 160 and then advance the build platform 106 downward—by a second distance less than or equal to the first distance—in preparation for curing a successive layer of the test build.

4.1.10 Controller

The base assembly 102 of the additive manufacturing device 101 can include a controller that controls the electromechanical components of the additive manufacturing device 101 in order to execute Blocks of the additive manufacturing process. Generally, the controller is an imbedded computer system that sends instructions to the projection system 120, the pressure regulation system 190, and the linear actuation system coupled to the build platform 106, to execute the additive manufacturing process. In one implementation, the controller controls and receives instructions from a user interface, which can be a touchscreen or a set of buttons, switches, nobs, etc. Alternatively, the controller can communicate with and receive instructions from an external computational device. In another implementation, the controller is connected to a network, such as the internet, and is configured to receive instructions over the network. Additionally, the controller can send commands, in the form of digital and/or analog electrical signals, in order to actuate various electromechanical components of the system 100 such as the magnetic locking mechanism, a door hatch release to the build chamber, the purge valves, and/or lighting elements within the build chamber. Furthermore, the controller can receive data from sensors integrated with the additive manufacturing device 101 and execute feedback control algorithms based on these data in order to modify the function of the projection system 120, the pressure regulation system 190, and/or the linear actuation system.

4.2 Tray Assembly

Figure 4B:
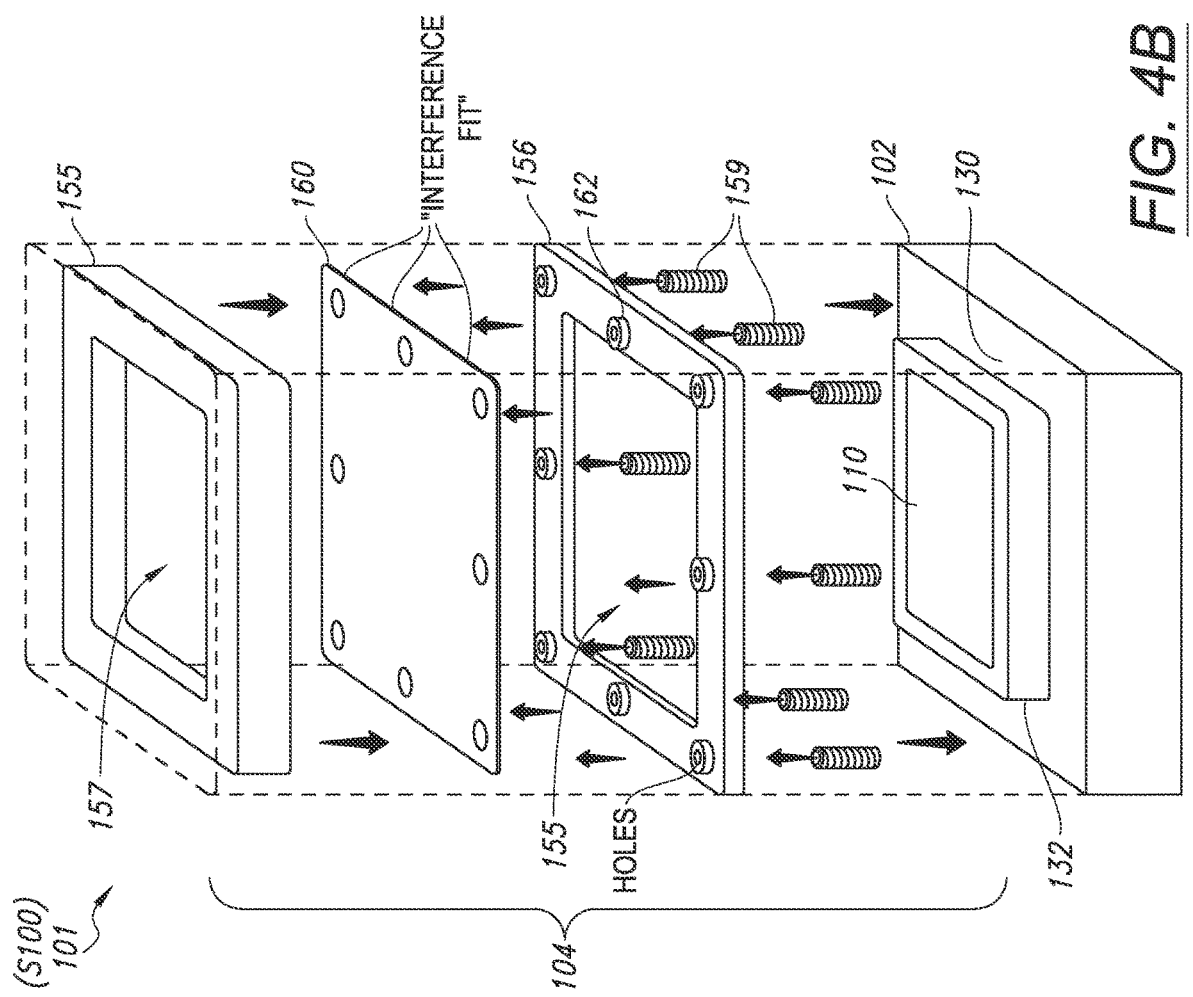
FIG. 4B is a schematic representation of one variation of the additive manufacturing device.

As shown in FIG. 4B, the additive manufacturing device 101 includes a tray assembly 104 (i.e. a build tray) which further includes: a tray structure 150 (which can define an upper member 155 and a lower member 156), a separation membrane 160, a set of tensioning gaskets 162, and/or a material-sealing gasket 164. The tray assembly 104 is configured to engage (e.g., kinematically mount to) the base assembly 102 over the window platform 132 via corresponding registration features 154 arranged on the underside of the tray structure 150 and reference features 134 on the tray seat 130. Generally, the tray assembly 104 contains the material reservoir during a build cycle and positions and maintains the tension in the separation membrane 160 over the window platform 132, build window 110, and/or fluid distribution ports 140. More specifically, the tray assembly 104 can include a tray structure 150 that defines an upper member 155 and a lower member 156, which are fastened together via a set of fasteners with the separation membrane 160 in between the upper member 155 and the lower member 156. Thus, the tray structure 150 functions to position the separation membrane 160 so that it is configured to: laminate across the upper surface of the build window 110 in response to an evacuation of fluid, via the fluid distribution port 140, from an interstitial region between the base assembly 102 and the tray assembly 104 in the engaged configuration; and configured to separate from the build window 110 in response to injection of fluid, via the fluid distribution port 140, into the interstitial region.

In one implementation, the base assembly 102 includes a sealed build chamber that encloses the tray assembly 104 and sealed. Additionally, the build chamber can be filled with an inert fluid, such as to enable use of reactive (e.g., reactive with oxygen) material chemistries in the additive manufacturing device 101. In one implementation, the build chamber is integrated with the upper member 155 of the tray structure 150. In this implementation, the material can be injected into the inner volume of the assembly including the build tray and the build chamber via an injection port such that the material is not exposed to the atmosphere at any point while being loaded into the tray assembly 104.

4.2.1 Tray Structure

Figure 5A:
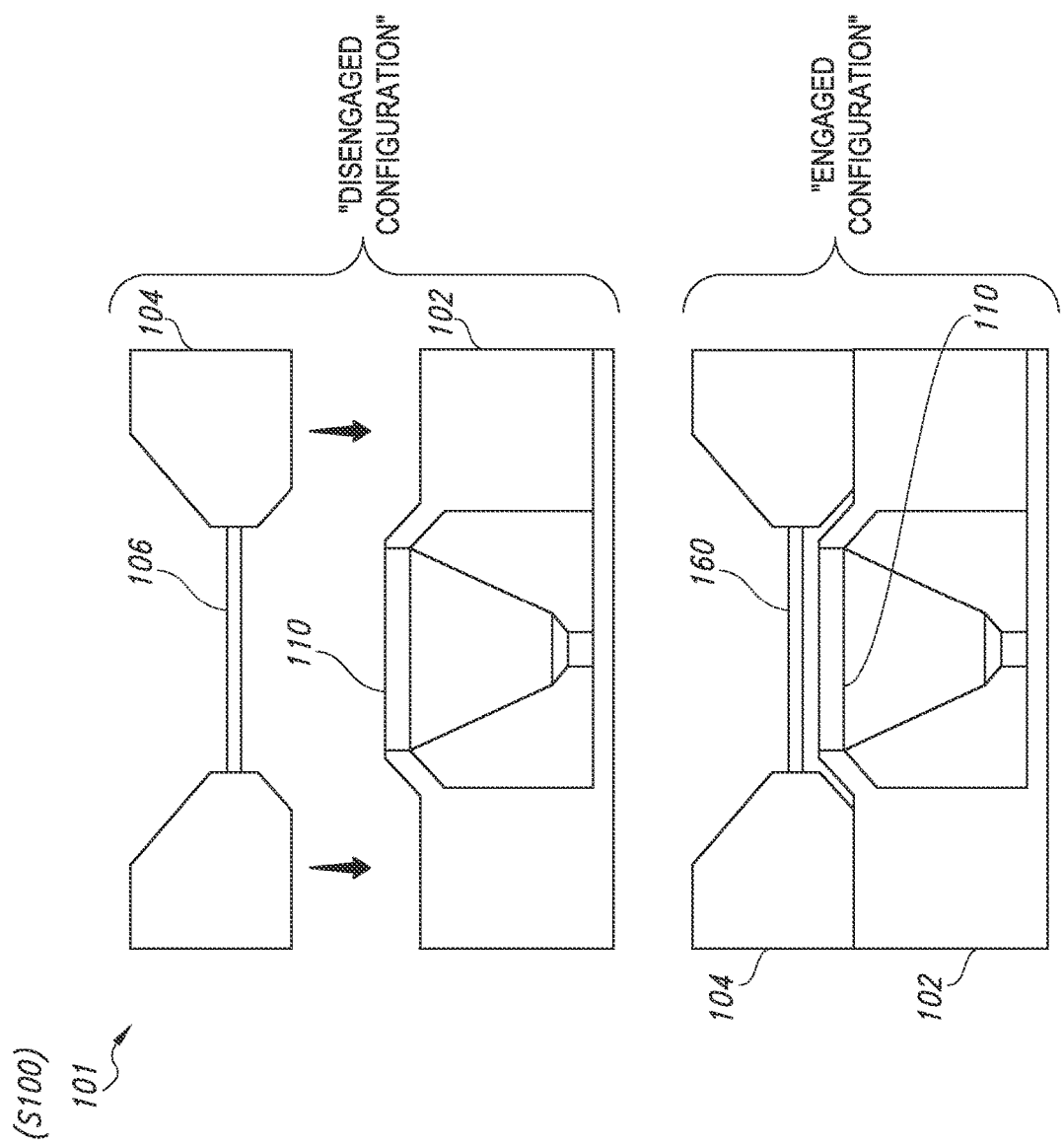
FIG. 5A is a schematic representation of one variation of the additive manufacturing device.

Generally, the tray structure 150: defines a tray aperture 152 spanned by the separation membrane 160 and circumscribing the build window 110; defines registration features 154 configured to engage with the reference features 134 of the tray seat 130; and defines an interior volume for containing the material reservoir. The tray structure 150 can be constructed from a rigid, non-reactive, temperature stable solid material, such as aluminum or another metal or metal alloy. In one implementation, the tray structure 150 is constructed from milled aluminum. Additionally, the tray assembly 104 can be a member of a set of tray assemblies associated with the additive manufacturing device 101, each tray assembly 104 in the set of tray assemblies including a tray structure 150 of a different shape or size in order to accommodate a wider variety of build sizes and shapes. In one implementation, the tray structure 150 includes an upper member 155 and a lower member 156 configured to fasten to each other via a set of fasteners. Thus, during assembly of the tray assembly, a user may arrange the separation membrane 160 between the lower member 156 and the upper member 155, thereby repeatably locating the separation membrane 160 relative to the tray seat 130 in the engaged configuration as shown in FIGS. 5A and 5B.

Generally, the upper member 155 of the build tray defines the volume occupied by the material during the build cycle and the region within which the additive manufacturing device 101 can selectively photocure this material into a test build via execution of a series of build cycles. The upper member 155 also defines a tray aperture 152 that corresponds to the window platform 132 such that the upper member 155 can be lowered over the window platform 132 of the base assembly 102. The tray aperture 152 in the upper member 155 is spanned by the separation membrane 160 thereby enclosing the volume defined by the upper member 155 from the bottom. Thus, the tray assembly 104 when fully assembled defines an interior volume above the separation membrane 160 tensioned across the tray aperture 152, the interior volume configured to contain a reservoir of material.

In one implementation, an inner surface of the build region is rounded to reduce stress concentrations in the separation membrane 160. In one implementation, the upper member 155 of the build tray defines a rounded rectangular build region. Additionally, the upper member 155 can define an inner surface that extends upward and perpendicular to the build window 110. The inner surface then expands upward and outward in a conical shape, wherein the vertical cross section of the conical inner surface has dimensions proportionally similar to the vertical cross-section of the perpendicular inner surface. Thus, the perpendicular and conical sections of the inner surface define a volume configured to contain the material reservoir. However, the upper member 155 of the build tray can define any rounded internal volume. Additionally, the upper member 155 can include integrated heating and/or cooling elements. The additive manufacturing device 101 can activate the heating and/or cooling elements to adjust the temperature of the material within the build tray to near an optimal temperature for the photocuring reaction of the material.

The lower member 156 defines a shape consistent with the inner surface of the upper member 155 and can define corresponding features to the reference features 134 in the tray seat 130 of the base assembly 102. In one implementation, the base assembly 102 and/or the lower member 156 contain magnets (i.e. magnetic registration features 154), which kinematically align the lower member 156, and therefore the tray assembly 104, to the base assembly 102 by biasing the lower member 156 against the reference features 134 in the base assembly 102. The lower member 156 also defines holes such that fasteners, such as screws or bolts, passing through the holes can insert into corresponding holes in the upper member 155. Alternatively, additive manufacturing device 101 can include fasteners that are directly integrated with either the upper member 155 and/or the lower member 156 and the additive manufacturing device 101 can include an upper member 155 and a lower member 156 configured to slot directly into the opposite member of the tray structure 150.

4.2.2 Separation Membrane

The separation membrane 160 can include a transparent, thin, and flexible film or sheet characterized by low adhesion to photocuring materials. The separation membrane 160 is manufactured at sizes specific to particular tray assemblies 104 and with holes aligned with tensioning posts 159 extending from either the upper member 155 or the lower member 156 of the build tray. Thus, the separation membrane 160 is positioned between the upper member 155 and the lower member 156 of the build tray such that the tensioning posts 159 extend from one member of the tray structure 150, through a hole, slot, or perforation in the separation membrane 160, and into corresponding negative features in the opposite member of the tray structure 150. Additionally or alternatively, the separation membrane 160 can define a set of holes and/or slots such that there is an interference fit between the separation membrane 160 and the set of tensioning posts 159, thereby preloading (i.e. automatically tensioning) the separation membrane 160 with a tensile stress.

Thus, the tray assembly 104 can include an upper member 155 and a lower member 156 with interlocking features and a separation membrane 160 perforated in an interference fit with these interlocking features. Therefore, the geometry of the tensioning posts 159 relative to the corresponding perforations in the separation membrane 160 functions to automatically tension the separation membrane 160 across the tray aperture 152 defined by the tray structure 150. For example, the upper member 155 of the tray structure 150 can define milled positive features including the tensioning posts 159 corresponding to milled negative features in the lower member 156 such that the negative features of the lower member 156 fit over the positive features of the upper member 155. In this example, the separation membrane 160 defines perforations corresponding to the positive features of the upper member 155 in an interference fit. In this implementation, the tray assembly 104 can further include separate fasteners-such as magnets, clasps, latches, and/or screws—to fasten the lower member 156 to the upper member 155.

However, the separation membrane 160 can be tensioned across the tray aperture 152 defined by the tray structure 150 in any other way (e.g., via direct bonding to the tray structure 150 or via another fastening configuration).

Thus, in one implementation, the tray assembly 104 can include: an upper member 155 defining a set of positive features including a set of tensioning posts 159; a lower member 156 defining a set of negative features configured to engage with the set of positive features; a separation membrane 160 arranged between the upper member 155 and the lower member 156 and defining a third set of perforations outwardly offset from the set of tensioning posts in an interference fit between the separation membrane 160 and the set of tensioning posts 159 tensioning the separation membrane 160 via the interference fit.

4.2.3 Tensioning Gaskets

In one implementation, the upper member 155 and the lower member 156 include a set of rubber or rubberized plastic gaskets arranged around each tensioning post 159 to distribute tensile force applied to the separation membrane 160 over a larger area, thereby preventing excessive lateral movement/shifting or tearing of the separation membrane 160 while under tension. The tensioning gaskets 162 effectively sandwich the separation membrane 160 to bear the load of the tension in the membrane across the entire area of the gasket. In addition, the tray assembly 104 can include tensioning gaskets 120 configured to achieve a particular distribution (e.g., an even distribution) of tensile forces across the membrane and a particular inflationary profile or behavior of the separation membrane 160 (e.g., similar separation of the membrane independent of location within the build region). Thus, the tensioning gaskets 162 can be arranged on the bottom surface of the upper member 155 and/or the upper surface of the lower member 156 around the holes defined for the tensioning posts 159 in the upper member 155 and the lower member 156.

4.2.4 Material-Sealing Gasket

The additive manufacturing device 101 can also include a material-sealing gasket 164 arranged along the edge of the tray aperture 152 of the upper member 155 of the build tray. Generally, the material-sealing gasket 164 prevents material ingress between the upper member 155 of the build tray and the separation membrane 160. Thus, when the tray assembly 104 is lowered over and around the window platform 132, the separation membrane 160 is tensioned and pulled upward by the window platform 132 protruding through the inner opening of the build tray spanned by the separation membrane 160. The separation membrane 160 is thus biased against the material-sealing gasket 164 on the edge of the interior opening of the upper member 155 of the build tray creating a seal against material held in the build tray. Additionally, the material-sealing gasket 164 can prevent excess shear stress from tearing the separation membrane 160 when it comes into contact with the interior edge of the upper member 155 of the build tray.

In implementations where the separation membrane 160 is not pulled upward by a protruding window platform 132 in the engaged configuration (e.g., in implementations where the separation membrane 160 is positioned less than one millimeter above the build window 110 in the engaged configuration when there is no pressure gradient across the separation membrane 160), the tray assembly 104 can include a set of material-sealing gaskets 164 circumscribing the tray aperture 152 in between the separation membrane 160 and the upper member 155 of the tray structure 150.

4.3 Material Temperature Control Subsystem

Figure 7:
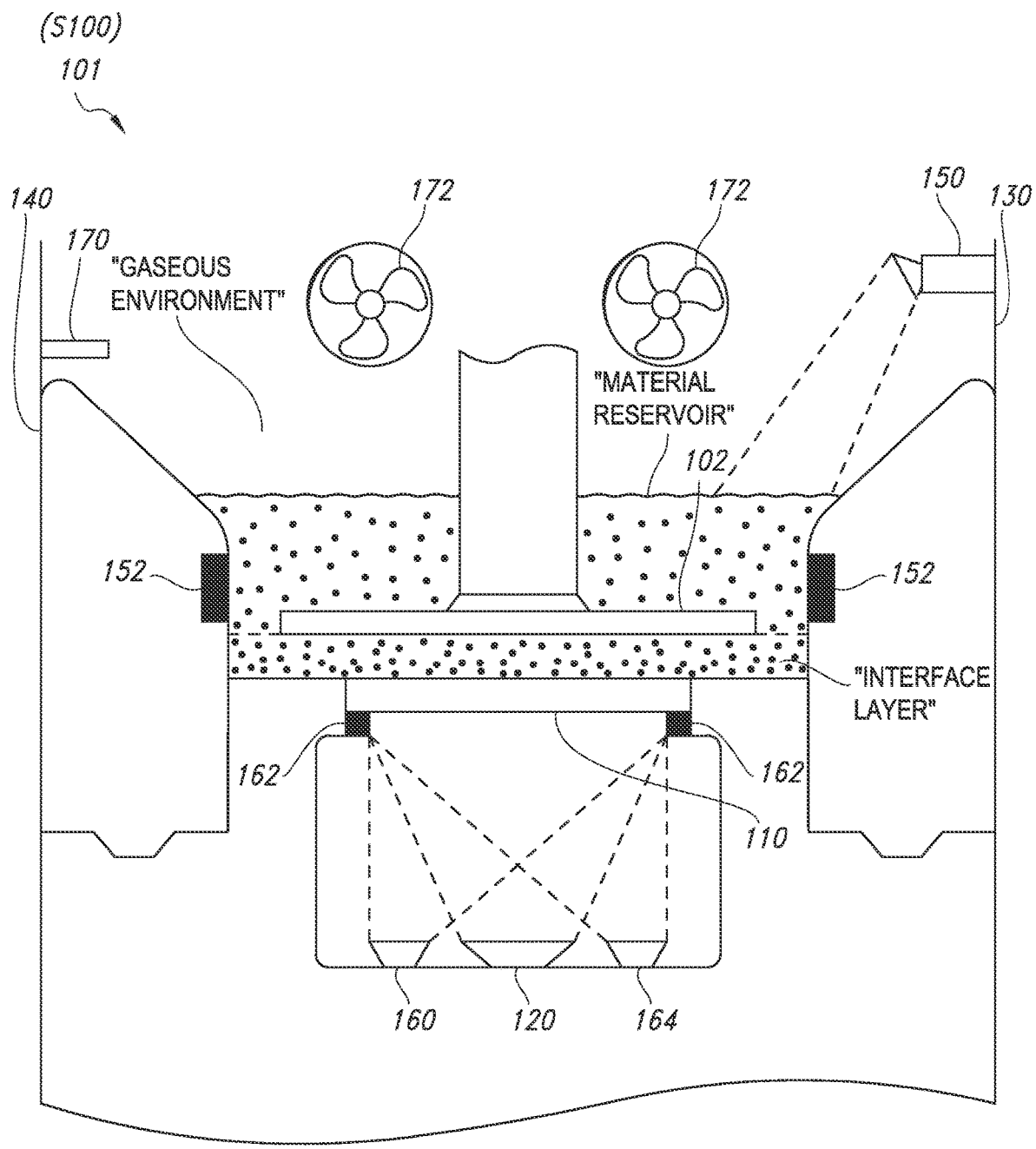
FIG. 7 is a schematic representation of one variation of the additive manufacturing device.

As shown in FIG. 7, the additive manufacturing system 101 can include a material temperature control subsystem that is configured to control the bulk material temperature of the material reservoir contained with the build tray 140. Depending on the implementation, the additive manufacturing system 101 can include multiple types of temperature sensing devices and/or heating or cooling devices.

In one implementation, the additive manufacturing system 101 includes a set of temperature sensors integrated with the build tray 140 (e.g., thermocouples, thermistors, digital thermometers) and communicatively coupled to the controller. In this implementation, the set of temperature sensors can be distributed along the inner wall of the build tray 140 such that the additive manufacturing system 101 can calculate a representative bulk temperature for the material reservoirs based on temperature readings from each of the set of temperature sensors.

In another implementation, the additive manufacturing system 101 can include a chamber-mounted thermal image sensor 160 defining a field of view coincident with the surface of the material reservoir contained within the build tray 140. Thus, the additive manufacturing system 101 can detect the bulk material temperature of the material reservoir via a thermal image sensor 160 arranged within the build chamber 130 and defining a field of view incident a surface of the material reservoir.

In yet another implementation, the additive manufacturing system 101 can include a set of heating elements 152 integrated with the build tray 140 and configured to heat the material reservoir within the build tray 140. For example, the additive manufacturing system 101 can include resistive heating elements within the build tray 140. Alternatively, the additive manufacturing system 101 can include a fluid heating system 100 configured to circulate heated water (or another working fluid) through channels within the structure of the build tray 140, thereby heating the material reservoir contained within the build tray 140. Additionally or alternatively, the additive manufacturing system 101 can include a fluid cooling system 100 configured to flow circulate cooled water (or another working fluid) through separate channels within the structure of the build tray 140.

Thus, via some combination of the detection elements and heating and/or cooling elements described above, the additive manufacturing system 101 can control the bulk material temperature based on instructions received from the controller.

4.4 Interface Temperature Control Subsystem

Generally, the additive manufacturing system 101 can include an interface temperature control subsystem configured to control the temperature of a material layer adjacent the build interface with the build window 110. More specifically, the additive manufacturing system 101 can include: a set of temperature sensing elements configured to measure the temperature of the interface layer of material (e.g., either an average temperature or a temperature distribution); and a set of heating elements configured to increase the interface temperature relative to the bulk material temperature. In one implementation, the additive manufacturing system 101 can include a set of temperature sensing elements such as a set of thermocouples, thermistors, or digital thermometers arranged at the perimeter of the build window 110 and configured to measure the temperature of the build window 110. Thus, the additive manufacturing system 101 can indirectly measure the temperature of the interface layer via conduction through the build window 110.

Additionally or alternatively, the additive manufacturing system 101 can include an interface thermal image sensor 160, which can directly measure infrared or near-infrared radiation emitted by the interface layer of material and calculate the temperature of the interface layer for each pixel of the interface thermal image sensor 160. Additionally, the interface temperature control subsystem can include additional interface heat sources further described below.

4.4.1 Interface Thermal Image Sensor

The additive manufacturing system 101 can also include a thermal image sensor 160 arranged under the build window 110 and configured such that the field of view of the thermal image sensor 160 spans the area of the build interface of the build window 110. Thus, the additive manufacturing system 101, via the thermal image sensor 160, can detect the interface temperature of the material at the build interface. The thermal image sensor 160 is electrically coupled to the controller, thereby enabling the controller to record thermal images of the build interface according to Blocks of the method S100. In one implementation, the thermal image sensor 160 is arranged relative to the projection subsystem 120 and interface heat source such that pixels in images captured from the thermal image sensor 160 correspond to pixels for projection of electromagnetic radiation from the projection subsystem 120 and/or areas of the build interface at which the interface heat source can precisely direct heat. In one implementation, the thermal image sensor 160 operates in the long-wavelength IR range (i.e. 8-15 micrometers), thereby enabling the interface thermal image sensor 160 to detect temperature differences within the material. Additionally or alternatively, the thermal image sensor 160 can operate within the mid-wavelength IR range (i.e. 3-8 micrometers). Thus, the additive manufacturing system 101 can detect a temperature of the interface layer via a thermal image sensor 160 arranged below the build window 110 and defining a field of view encompassing the build interface.

4.4.2 Interface Heat Source

The additive manufacturing system 101 includes an interface heat source that is configured to direct heat toward the build interface of the build window 110. Depending on the implementation of the additive manufacturing system 101, the interface heat source can selectively heat regions of the build interface or it can apply heat spanning the whole build interface. In one implementation, the additive manufacturing system 101 includes an IR lamp as the interface heat source, arranged below the build window 110 (adjacent the projection subsystem 120 and/or the interface thermal image sensor 160), and configured to direct IR light toward the build interface from below, thereby broadly heating the interface layer of material at the build interface. In another implementation, the additive manufacturing system 101 can include a transparent resistive heating element imbedded within the build window 110 (e.g., a conductive optically clear film) configured to selectively heat regions of the build interface or broadly heat the build window 110, thereby evenly transferring heat to the material at the build interface. Additionally or alternatively, in this implementation, the additive manufacturing system 101 can selectively heat regions of the build interface by selectively activating corresponding regions of the transparent resistive heating element. Thus, the additive manufacturing system 101 can heat the build interface according toward a target temperature profile.

In yet another implementation, the additive manufacturing system 101 can include a set of heating elements (e.g., resistive heating elements) arranged around the perimeter of the build window 110 and configured to conduct heat into the build window 110, thereby indirectly heating the interface layer of material adjacent the upper surface of the build window 110. Thus, the additive manufacturing system 101 can heat the interface layer of the material reservoir toward the target reaction temperature via the set of heating elements arranged along a perimeter of the build window 110.

Alternatively, the additive manufacturing system 101 can include a digital IR projector 164 as the heat source to selectively heat regions of the build interface based on a temperature distribution recorded by the thermal image sensor 160. More specifically, the additive manufacturing system 101 can heat the interface layer of the material reservoir toward the target reaction temperature via an IR projector 164 defining a projection area aligned with the build window 110.

The IR projector 164 can include a digital micromirror device (hereinafter "DMD"), an IR source, and a series of optical lenses configured to direct IR light from the IR source to various locations across the build interface (such as according to a DLP projector). Thus, by digitally adjusting the configuration of the DMD, the additive manufacturing system 101 is able to selectively direct IR light through the build window 110, on a pixel-by-pixel basis, thereby selectively heating the material at the build interface.

4.5 Chamber Temperature Control Subsystem

The additive manufacturing system 101 can also include a chamber temperature control subsystem configured to heat and/or pressurize the build chamber 130 to a specified temperature and pressure. Thus, the chamber temperature control subsystem can include multiple electromechanical components configured to vent air or inert gases into and out of the build chamber 130, chamber heating elements 172 within the build chamber 130, heating elements outside the build chamber 130 to preheat gas being pumped into the build chamber 130, a digital thermometer 170 configured to record the chamber temperature of the gaseous environment within the build chamber 130 in order to implement temperature control algorithms (e.g., PID controls, or thermodynamic models of the build chamber 130 environment) to adjust the temperature within the build chamber 130, and/or pressure sensors configured to record the pressure within the build chamber 130 in order to regulate the pressure according to pressure control algorithms. Thus, the additive manufacturing system 101 can control the temperature and pressure of the gaseous environment within the build chamber 130 via the controller communicating with the chamber temperature control subsystem.

4.6 Sensor Suite

Generally, additive manufacturing device 101 can include a sensor suite that includes: temperature sensors (e.g., digital thermometers, thermistors, thermocouples, thermographic image sensors), pressure sensors (e.g., barometers), force sensors (e.g., load cells, strain gauges), accelerometers, gyroscopes, magnetometers, vibration sensors, proximity sensors, light intensity sensors, microphones, image sensors (e.g., multispectral or visible light), oxygen concentration sensors, humidity sensors, and depth sensors. Therefore, additive manufacturing device 101 can monitor conditions within the build chamber and extract a set of physical measurements of a test build during or after the additive manufacturing process.

The sensor suite can include a set of dimensional sensors such as image sensors, lidar scanners, structured light sensors, and/or depth sensors positioned within the build chamber or below the build window configured to extract particular physical dimensions (or measurements) from the test build. The additive manufacturing system 101 can capture images of the completed test build via the set of image sensors and extract particular physical dimensions via optical measurement and three-dimensional modelling techniques. Thus, the system 100 can extract and access physical measurements of the test build via integrated sensors within the additive manufacturing device 101.

In one implementation, the sensor suite includes a set of temperature sensors configured to capture the ambient temperature of the build chamber, the bulk temperature of the material in the build tray, and/or the material temperature at the build interface of the separation membrane. Additionally or alternatively, the sensor suite can include thermographic image sensors configured to detect a spatial distribution of these temperatures across the aforementioned locations in the build chamber. For example, the additive manufacturing device 101 can include a thermographic image sensor that can detect the spatial temperature distribution across the build interface at which the photocuring reaction occurs during the photocuring phase of the additive manufacturing process.

In another implementation, the sensor suite includes a set of force sensors configured to detect force applied to the build platform during retraction phase or the advancement phase of the additive manufacturing process. For example, the set of force sensors can detect forces generated by the linear actuator of the build platform acting against suction and/or adhesion forces between the build window and the separation membrane and between the separation membrane and the most recently photocured layer of a test build. In another example, the set of force sensors can detect force applied by the advancement of the build platform and adhered test build into the volume of material in the build tray prior to initiation of a subsequent build cycle. Thus, the additive manufacturing device 101 can detect whether successful separation of a test build from the separation membrane has occurred during each build cycle of the additive manufacturing process and/or adjust retraction- and advancement-related build parameters for successive build cycles during the additive manufacturing process.

In yet another implementation, the sensor suite can include a set of pressure sensors configured to detect pressure (e.g., differential or absolute) within the build chamber and/or within the interstitial region between the separation membrane and the build window.

In yet another implementation, the sensor suite can include a set of microphones configured to detect sounds and vibrations occurring within the build chamber during a build cycle of the additive manufacturing process. Thus, the additive manufacturing device 101 can compare audio between build cycles of the additive manufacturing process in order to detect changes in the efficacy of separation of the test build from the separation membrane and the separation membrane from the build window.

In yet another implementation, the sensor suite can include a set of humidity sensors and/or oxygen concentration sensors configured to capture the humidity and oxygen concentration of the gaseous environment within the build chamber. Thus, additive manufacturing device 101 can detect whether build failure has occurred or is likely to occur upon detecting that the humidity or oxygen concentration with the build chamber outside of a target range corresponding to the material.

In yet another implementation, the sensor suite can include a set of depth sensors configured to detect the depth of the material within the tray assembly 104. Thus, the additive manufacturing device 101 can modify advancement of the build platform 106 toward the build window 110 based on the depth of the material in the tray assembly 104, thereby preventing deformation of a test build upon contact with viscous material contained within the tray assembly 104 during the advancement phase of the additive manufacturing process.

5. Engagement and Initialization

As shown in FIG. 4B, before the additive manufacturing device 101 executes the additive manufacturing process, the user may fasten the separation membrane 160 between the lower member 156 and upper member 155. Once the separation membrane 160 is fastened between the upper member 155 and lower member 156 of the build tray, the user may lower the tray assembly 104 over the upper surface of the window platform 132 and the build window 110. As shown in FIGS. 5A AND 5B, the tray then kinematically aligns with the reference features 134 of the base assembly 102, thereby engaging with the base assembly 102. In the passive lamination variation, when the tray assembly 104 and the base assembly 102 are engaged the separation membrane 160 is tensioned flush against the surface of the build window 110 and covers the fluid distribution channel 142. In this variation, the separation membrane 160 also forms a fluid-impermeable seal (within the maximum operating pressure of the additive manufacturing device 101) against an interstitial gasket 170 arranged along the edge of the window platform 132 or with the edge of the window platform 132 itself. In the active lamination gasket variation of the additive manufacturing device 101, the separation membrane 160 is positioned just above the build window 110 upon kinematic alignment of the tray assembly 104 with the tray seat 130 of the base assembly 102.

Before or after the tray assembly 104 is engaged with the base assembly 102, material is loaded into the volume defined by the upper member 155 of the build tray and the separation membrane 160. If the material is not sensitive to oxygen and/or ambient air, the material may be poured directly into the build tray. However, if the material is sensitive to oxygen, humidity, and/or ambient air, the material can be injected into a tray assembly 104 through a sealed port in a sealed build chamber after the build chamber has been filled with an inert fluid.

Thus, after loading is complete, the build volume defined by the inner surface of the build tray is at least partially occupied by a volume of material. The material is in contact with the upper surface of the separation membrane 160 and the inner surface of the upper member of the tray assembly 104. However, the material does not come into contact with the build window 110 underneath the separation membrane 160.

5.1 Build Cycle

Figure 8:
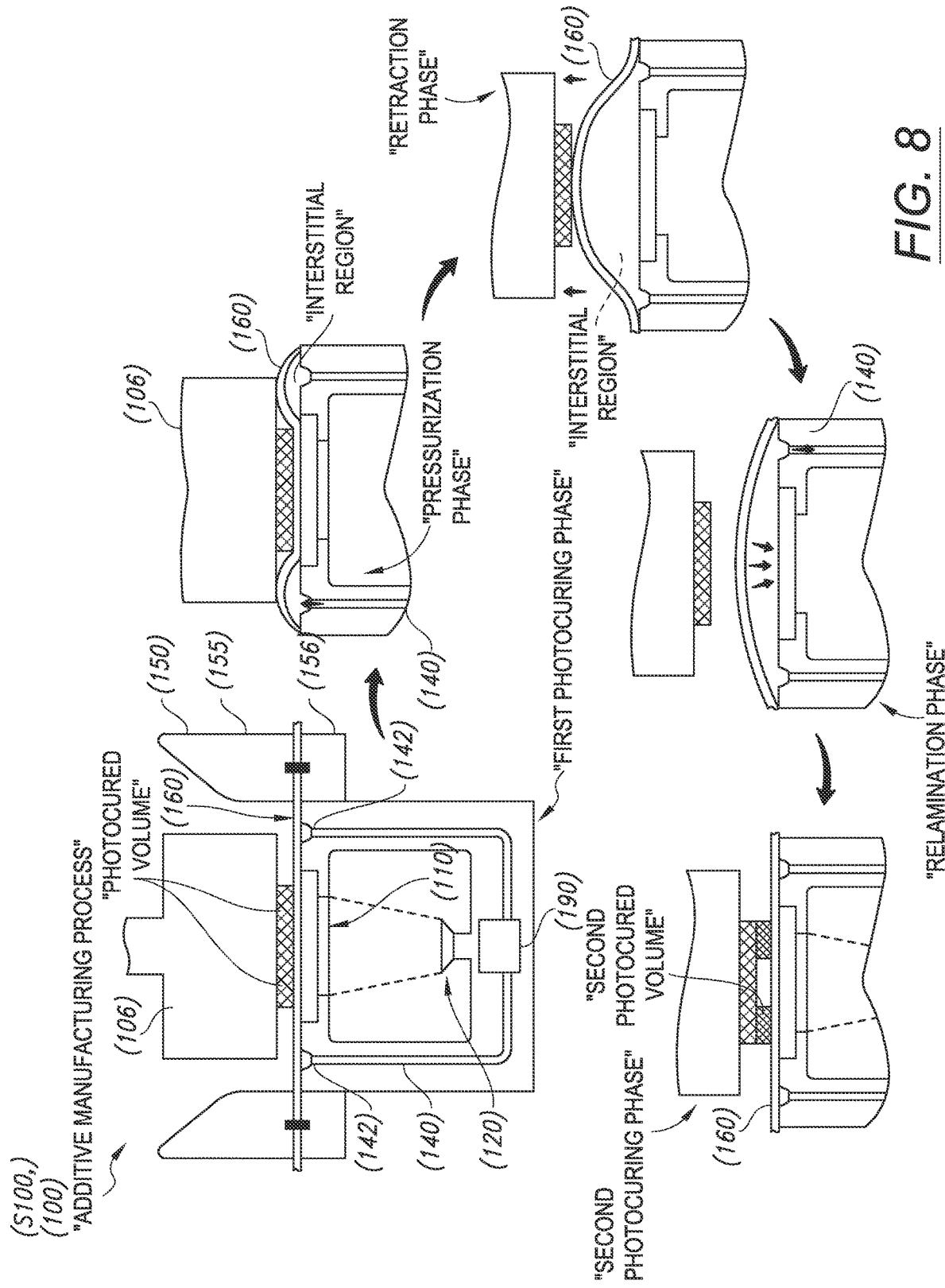
FIG. 8 is a flowchart representation of one variation of an additive manufacturing process.

Generally, as shown in FIG. 8 and referenced above, the additive manufacturing device 101 executes the additive manufacturing process to: selectively photocure a volume of material corresponding to a layer of a test build; separate the separation membrane 160 from the build window 110, and also the newly cured layer of the test build from the separation membrane 160; and reposition the separation membrane 160 and build platform 106 (adhered to the first layer) in preparation for photocuring a subsequent layer of the test build. More specifically, the additive manufacturing device 101: cures a first layer of the test build; inflates the interstitial region between the separation membrane 160 and the build window 110; retracts (e.g., raises) the build platform 106 vertically upward away from the build window 110; and depressurizes the region between the separation membrane 160 and the build window 110 in order to peel the separation membrane 160 away from the first layer of the test build and draw the separation membrane 160 down onto and flat against the build window 110. In one implementation, the additive manufacturing device 101 can also advance/reposition the build platform 106 (and the adhered first layer of the test build) such that the lower surface of the most recently cured layer of the test build is offset from the surface of the separation membrane 160 (that is laminated across the build window 110) by a distance equal to a target layer thickness of the next layer.

Additionally, the additive manufacturing device 101 can execute phases of the additive manufacturing process in a synchronized sequence-such as during discrete or (partially-) overlapping time periods—in order to repeatably separate layers of the test build, including the newly cured layer of the test build from the separation membrane 160 and with minimal damage or deformation of the test build in its green state.

Furthermore, some phases of the additive manufacturing process may be described with reference to a "first layer" of the test build. However any of these phases of the additive manufacturing process are also applicable to subsequent layers of the test build.

6. Test Variables

Generally, the system 100 can access a selection of a set of test variables representing a build parameter of the additive manufacturing device 101. Therefore, these test variables can be device settings that are modulated by the additive manufacturing device 101 on an intralayer and/or interlayer basis during manufacturing of a test build. The particular test variables available for selection are related to the features of the additive manufacturing system 101. Additionally, in some implementations, the additive manufacturing device 101 can modify only a subset of the test variables on an intralayer basis. Thus, the system can generate a geometry of the test build based on the particular test variable or set of test variables selected.

In one implementation, the additive manufacturing device 101 can modulate (or vary) the total incident exposure energy (i.e., exposure energy) applied to the material by the projection system during the photocuring phase of each build cycle of the additive manufacturing process as a testing parameter. Exposure energy is expressed in units of energy per unit area. Additionally, the additive manufacturing device 101 can modulate the exposure energy profile as a test variable. The exposure energy profile represents the application of exposure energy to the material over time during the photocuring phase of the additive manufacturing process. Thus, the system can represent the exposure energy profile as a combination of exposure intensity, expressed in units of power per unit area, and exposure duration, expressed in units of time, thereby indicating a constant application of electromagnetic energy to the material during the photocuring phase of the additive manufacturing process.

In one implementation, the system can represent the exposure energy profile as a profile representing the cumulative exposure energy directed toward the material relative to time elapsed during the photocuring phase of the additive manufacturing process. In this implementation, the system can apply electromagnetic energy to the material according to the exposure energy profile by modulating the exposure energy intensity throughout the duration of the photocuring phase. For example, the system can direct the additive manufacturing device to project electromagnetic radiation initially at a low intensity and increase this intensity throughout the photocuring phase of the additive manufacturing process. Thus, the system can vary the exposure energy profile while maintaining the total exposure energy across a test build.

Generally, modulating the exposure energy affects the cure depth of the material, while modulating the exposure energy profile at a given exposure energy can affect the shrinkage and/or warpage of the material, the dimensional accuracy and the accompanying dimensional scaling factors for the material, the edge building characteristic of the material, and/or the mechanical properties of the material.

In another implementation, the additive manufacturing device 101 can vary the exposure delay, expressed in units of time post-exposure, between completion of the photocuring exposure and retraction of the newly cured layer from the build window as a test variable. Relatedly, the additive manufacturing device 101 can vary the advancement rate and/or print speed for a test build on an interlayer basis as a test variable. Changes to these build parameters can affect the resulting mechanical properties of the test build due to the changes in forces applied to the build during progression of the additive manufacturing process.

In yet another implementation, the additive manufacturing device 101 can vary, the projection pattern of the projection system and access a selection of projection pattern as a test variable. This build parameter can affect the edge building characteristics of the material as well as the surface finish and surface texture of the test build, as well as other material properties.

In yet another implementation, the additive manufacturing device 101 can vary the reaction temperature (i.e., the temperature at the build interface during the photocuring phase of the build process) on an interlayer or intralayer basis as a test variable. In one example, the additive manufacturing device 101 can vary the reaction temperature by adjusting other related test variables such as the exposure energy profile and advancement speed in order to modulate the reaction temperature at the build interface on an interlayer basis. In another example, the additive manufacturing device 101 can modulate the reaction temperature on an intralayer basis via the IR projector 164 or another selective heating device. Changes to this build parameter can affect a variety of material properties based on changes to the photopolymerization reaction rate.

In yet another implementation, the additive manufacturing device 101 can vary the bulk material temperature, as a test variable, on an interlayer basis by heating or cooling the material reservoir via the material temperature control subsystem. Changes to this build parameter can affect the viscosity of the uncured material and, consequently, the dimensional accuracy of the photocured test build.

In yet another implementation, the additive manufacturing device 101 can vary the layer thickness, as a test variable, on an interlayer basis by increasing or decreasing the depth of cure via changes in exposure energy and by increasing the retraction distance executed by the build platform for each build cycle of the additive manufacturing process.

In yet another implementation, the additive manufacturing device 101 can vary the maximum retraction force and/or maximum retraction speed during the retraction phase of the additive manufacturing process, as a test variable, on an interlayer basis. The additive manufacturing device 101 can vary the maximum retraction force and/or maximum retraction speed by reconfiguring the control algorithm of the build platform. This build parameter can affect the dimensional accuracy and mechanical properties of the test build due to the resulting changes in the force applied to the test build during separation of each layer of the test build from the build window.

In yet another implementation, the additive manufacturing device 101 can vary, as a test variable, the maximum separation pressure within the interstitial region on an interlayer basis via the pressure regulation system. This build parameter can affect the dimensional accuracy and mechanical properties of the test build due to the resulting changes in the force applied to the test build during separation of each layer of the test build from the build window.

7. Material Parameters

Generally, the system 100 can generate a test file for a test build based on a set of test variables and a set of material parameters (i.e., one or more material parameters), which are the measurable dependent variables corresponding to test regions of the test build. Thus, by identifying the test region of a test build that most closely exhibits a set of target values for the selected set of material parameters (based on a set of development criteria), the system 100 can identify target ranges of the set of test variables corresponding to the test region. Alternatively, upon failing to identify any test region of the test build that exhibits the set of target values of the set of material parameters, the system 100 can trigger a reformulation prompt and halt the iterative material development process.

The system can select certain variables as either a test variable or a material parameter based on the current level of characterization of the material. For example, the system 100 can initially designate depth of cure as a material parameter depending on the test variable of exposure energy. However, upon characterizing the relationship between exposure energy and depth of cure of the material (by calculating the working curve of the material via a depth of cure test), the system 100 can then cooperate with the additive manufacturing device 101 to vary the depth of cure as a test variable in subsequent iterations of the iterative material development process. Thus, any of the following examples of material parameters can be selected as a test variable upon sufficient characterization of these material parameters relative to other more fundamental test variables.

The system 100 can characterize any of the following set of material parameters including: a depth of cure of the material, a temperature-viscosity curve of the uncured material, horizontal dimension scale factors for the green and/or post-cured material, vertical dimension scale factor for the green and/or post-cured material, an edge building characteristic of the green and/or post-cured material, a warpage factor of the green and/or post-cured material, a surface finish metric of the green and/or post-cured material (e.g., surface roughness), tensile mechanical properties of the green and/or post-cured material (e.g., ultimate tensile strength, elongation at break, elastic modulus), shear mechanical properties of the green and/or post-cured material (e.g., shear strength, shear modulus), compressive mechanical properties of the green and/or post-cured material (e.g., characteristic strength), maximum overhang angle of the green and/or post-cured material, color and/or optical characteristics of the post-cured material, UV stability and/or durability of the post-cured material, etc. Thus, the system 100 can generate a test file and photocure a corresponding test build that characterizes the dependence of one or more of these material parameters on the selected test variable, as is further described below.

8. Test Variable and Material Parameter Selection

Generally, the system 100 can access selections of a set of test variables and a set of material parameters for each iteration of the iterative material development process. More specifically, the system 100 can: access a first selection of a first test variable and a first material parameter in Block S110; and access a second selection of a second test variable and a second material parameter in Block S112. The system 100 can continue accessing selections of a set of test variables and a set of material parameter for each successive iteration of the iterative material development process. Upon accessing a selection of a set of test variables and a material parameter, the system 100 can automatically generate a test file and photocure a corresponding test build to characterize the material parameter across a range of test variable values.

In one implementation, the system 100 can access a selection of a set of test variables and/or a set of material parameters and can initiate a multivariate test of the material via a single iteration of the iterative material development process. More specifically, the system 100 can: access a selection of a set of test variables (e.g., a first test variable and a second test variable) and a set of material parameters (e.g., a first material parameter and a second material parameter); generate a test file defining test regions, each corresponding to a combination of values of the set of test variables; access a set of physical measurements representing each material parameter in the set of material parameters; and calculate a target range for each test variable in the set of test variables based on the set of physical measurement representing each material parameter. Thus, the system 100 can photocure a test build that varies multiple test variables across discrete test regions of the test build from which the system 100 can extract multiple sets of physical measurements representing a set of material parameters.

In another implementation, the system 100 can access a selection of a set of test variables and/or a set of material parameters from a graphical user interface (hereinafter "GUI") or application programming interface (hereinafter "API") associated with the system 100 and executing on a computing device in communication with the system 100 (e.g., via a local or wide area network such as the internet). In this implementation, a user can manually or programmatically input a test variable and/or a material parameter for each iteration of the iterative material development process. Thus, the system 100 can access selections of test variables and material parameters directly from a user or a user-written program.

Figure 9:
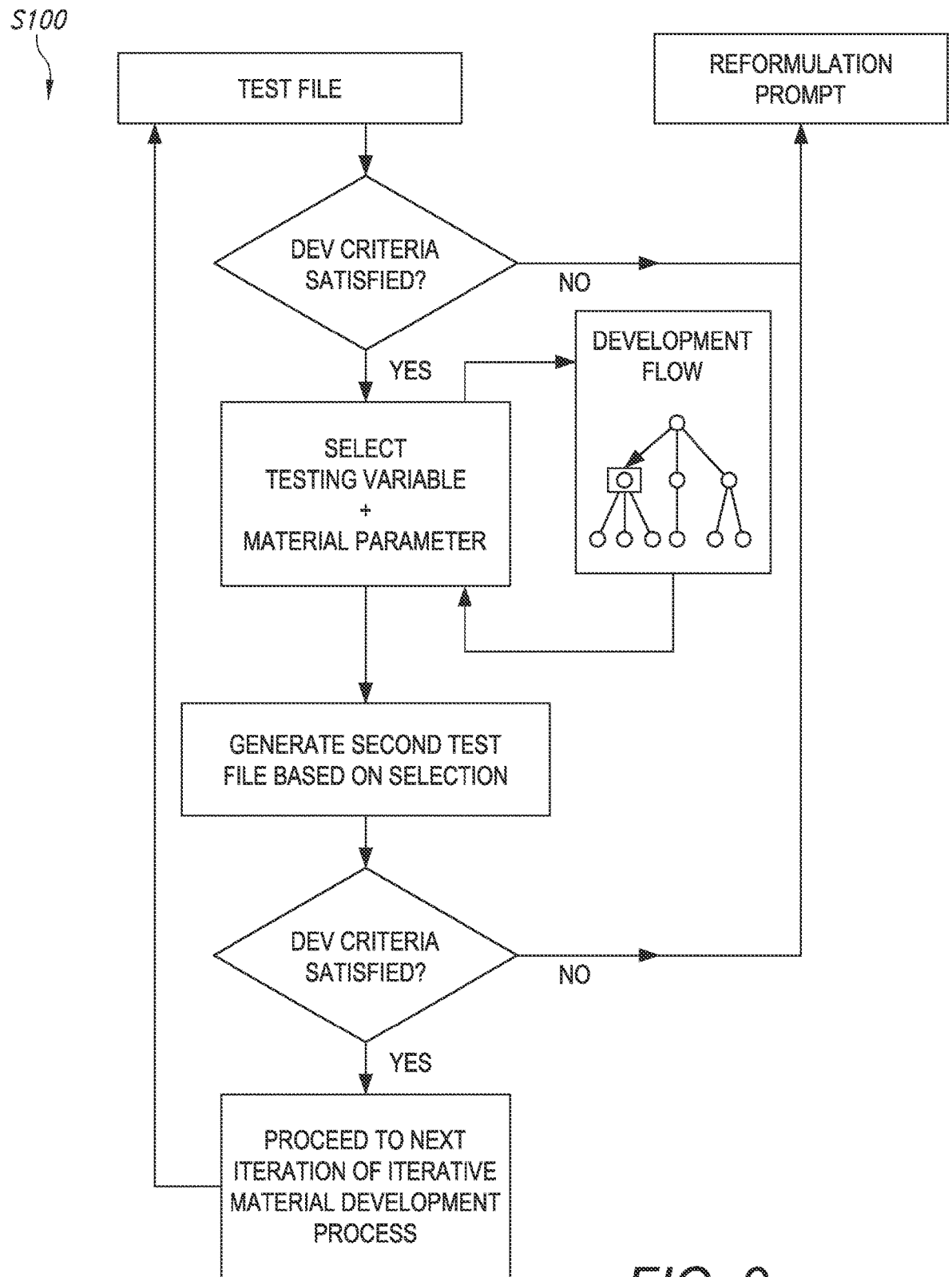
FIG. 9 is a flowchart representation of one variation of the method.

Alternatively, as shown in FIG. 9, the system 100 can access a selection of a set of test variables and/or a set of material parameters based on a predetermined development flow for the iterative material development process. More specifically, the system 100 can establish a graph (e.g., a directed graph or tree) that defines an order of test variables and material parameters based on the results of prior iterations of the iterative development process. For example, the system 100 can access a development flow that defines a first test build, second test builds based on the results of the first test build, third test builds based on the results of each second test build, etc. Additionally, the system 100 can access a development flow that establishes development criteria at transitions between test builds in order to evaluate whether to continue additional iterations of the iterative material development process or to halt the iterative material development process and generate a reformulation prompt.

In one example development flow, the system 100 can: access a first selection of total exposure energy, as a first test variable, and cure depth, as a first material parameter; generate a cure characterization test file defining a set of test regions arranged across a build area, each test region in the set of test regions characterized by a total exposure energy value; photocure a cure characterization test build by, for each test region in the set of test regions of the cure characterization test file, selectively exposing the material to a quantity of exposure energy corresponding to the total exposure energy value characterizing the test region; and access a first set of physical measurements representing a depth of cure for each test region in the set of test regions; and calculate a working curve of the material based on the first set of physical measurements. Upon calculating the working curve of the material, and therefore the minimum depth of cure, the system 100 can reference the development flow to access a second test variable and a second material parameter. For example, the system 100 can access layer thickness as a second test variable and a measure of dimensional accuracy (e.g., horizontal scaling factor, edge building characteristic) as a second material parameter for a second test build. In another example, the system 100 can access, from the development flow, exposure energy profile as a second test variable and elastic modulus as a second material parameter for a second test build.

In one implementation, the system 100 can, via a development flow, access a different test variable and/or a different material parameter based on the calculated target range of the test variable of the previous iteration of the iterative material development process and/or based on the corresponding range of the material parameter of the previous iteration of the iterative material development process. Thus, the system 100 can progress through the development flow based on the current level of characterization of the material. For example, in response to calculating that the critical energy of the material is greater than or less than a predetermined critical energy range, the system 100 can access, via the development flow, the exposure energy profile as a second test variable for a subsequent iteration of the iterative material development process. Additionally or alternatively, upon calculating a target range of a test variable that is wider than a predetermined threshold range defined by the development flow, the system 100 can repeat the same test as in the previous iteration of the iterative development process and change the discrete values of the test variable corresponding to each test region of the test build in order to narrow the target range of the test variable and improve characterization of the corresponding material parameter.

Additionally, the system 100 can generate a development flow in response to receiving a user-established priority or ranking of material parameters (via the GUI or the API). Thus, the system 100 can generate a development flow that prioritizes certain test variables and material parameters early in the iterative development process, thereby reducing the number of testing iterations prior to characterizing high-priority material parameters. For example, the system 100 can receive a ranking of material parameters from a user that indicates a target elastic modulus for the material. The system 100 can therefore generate a test build that enables characterization of the elastic modulus of the material as a second test, directly after characterization of the working curve of the material.

Generally, the system 100 can access a development flow for the iterative material development process that indicates a set of development criteria to be satisfied prior to advancing to a subsequent iteration of the iterative material development process. More specifically, the system 100 can, in response to the first target range of the first test variable satisfying a first set of development criteria: access a second selection of a second test variable and a second material parameter; generate a second test file based on the second selection, the second test file defining a first target value of a first test variable within the first target range of the first test variable and defining the second set of test regions, each test region in the second set of test regions characterized by the value of the second test variable; photocure a second test build based on the second test file according to the value of the second test variable characterizing each test region in the second set of test regions and the first target value of the first test variable; access a second set of physical measurements of the second test build, the second set of physical measurements representing the value of the second material parameter for each test region in the second set of test regions; and calculate the second target range of the second test variable based on the second set of physical measurements. Thus, the system 100 can progress from one iteration of the iterative material development process to the next, in response to the results of the previous iteration satisfying a predetermined set of development criteria.

In one implementation, the system 100 can access a set of development criteria establishing a minimum and or maximum value for the target range of the test variable and/or a minimum or maximum value of the material parameter measured during an iteration of the iterative material development process. Alternatively, the system 100 can access a set of development criteria that establishes a particular relationship or function between the test variable and the material parameter of the previous iteration of the material development process In addition to gating progression of the iterative material development process from one test to the next based on development criteria, the system 100 can also generate and transmit (via a GUI or API) a reformulation prompt in response to the results of the previous test of the iterative material development process failing to satisfy the set of development criteria established for that test. More specifically, the system 100 can, in response to the target range of the first test variable failing to satisfy a first development criteria, prompt a user to reformulate the material via a reformulation prompt. Thus, the system 100 can notify users automatically when the material parameters for a material are outside of predetermined limits for the material.

Generally, the system 100 can access user-input development criteria for each edge connecting nodes in the development flow (i.e., for each transition between tests in the development flow). The system 100 can receive development criteria in the form of logical or mathematical statements entered by the user.

In one example development flow, the system can prioritize basic printability parameters (e.g., target cure depth, target exposure energy, target exposure), functional parameters (e.g., mechanical properties, geometry-specific parameters), refined printability parameters (e.g., dimensional accuracy parameters, shrinkage and warpage parameters), and print-speed parameters (e.g., advancement speed maximum retraction speed).

9. Test Files

Figure 10:
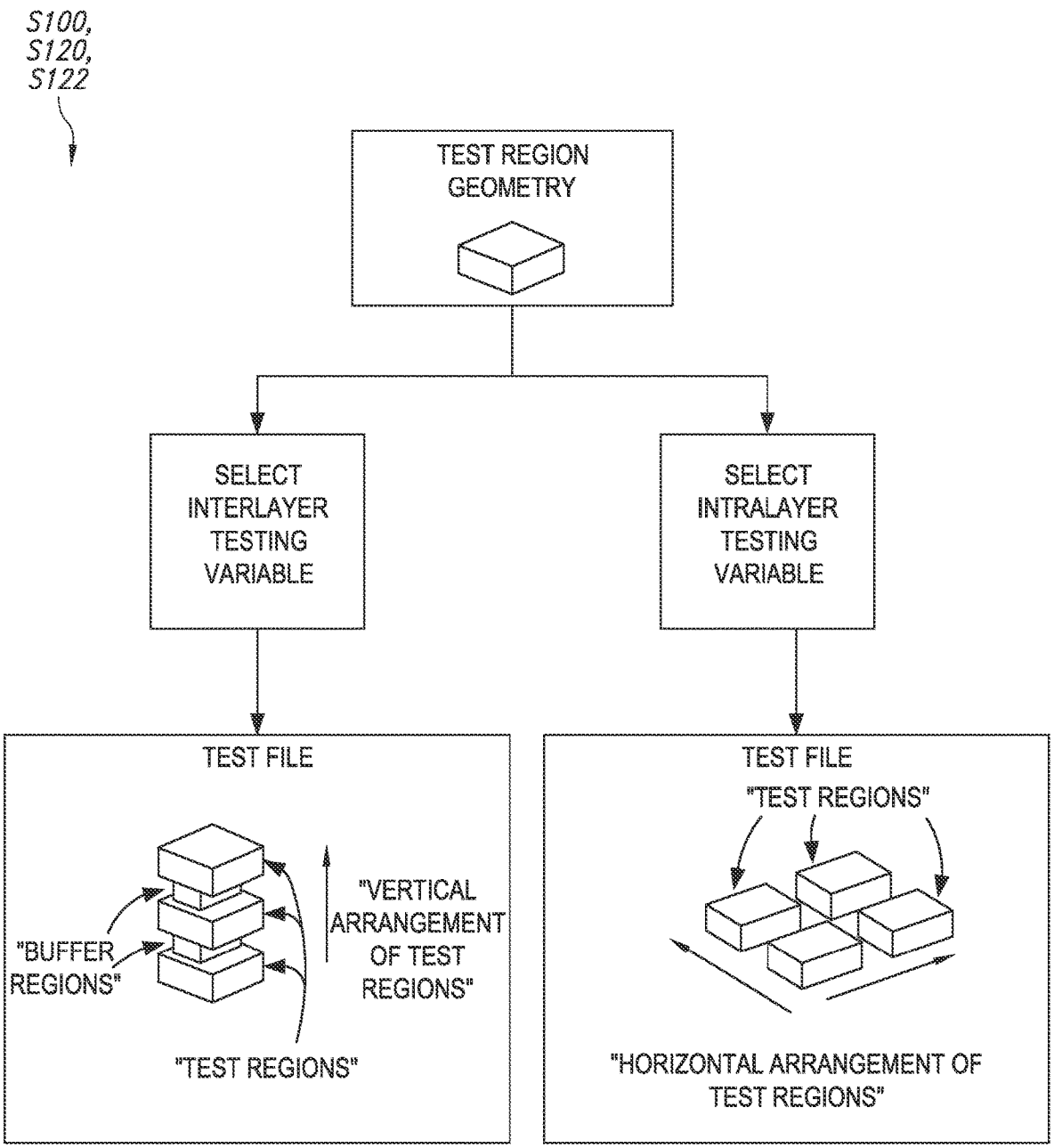
FIG. 10 is a flowchart representation of one variation of the method

As shown in FIG. 10, upon accessing a selection of a set of test variables and a set of material parameters (either via user input or via a development flow), the system 100 can generate a test file (a virtual representation of the test build) based on the selection and based on any prior characterization of target ranges for test variables and/or prior characterization of material parameters. More specifically, the system 100 can generate a first test file based on a first selection, the first test file defining a first set of test regions, each test region in the first set of test regions characterized by a value of a first test variable in Block S120. Likewise, for a subsequent iteration of the iterative material development process, the system 100 can generate a second test file based on the second selection, the second test file defining a first target value of the first test variable within the first target range of the first test variable and defining a second set of test regions, each test region in the second set of test regions characterized by a value of the second test variable in Block S122. Thus, based on the selection of a test variable and a material parameter, the system 100 can generate a test file defining a geometry that enables measurement of the selected material parameter within discrete test regions, where each test region is subject to a discrete value of the selected test variable.

Generally, the system 100 generates a test file that defines a three-dimensional representation of the geometry of a test build, the locations of set of test regions relative to the geometry of the test build, and the specific values of the set of test variables characterizing each test region in the set of test regions. Therefore, the system 100 can generate the test file as a standard computer-aided design file, such as an STL file, in combination with a separate file, such as CSV or XML file, that designates the test regions and the values of the set of test variables characterizing each test region. Alternatively, the system 100 can generate the test file in a proprietary format that defines the test regions, corresponding test variable values, and the geometry of the test build.

In one implementation, the system 100 generates the test file by generating a test region geometry and repeating this test geometry for each discrete test region in the set of test regions. In this implementation, the system 100 can generate a test region geometry based on the selected material parameter the test. Example correspondences between selected material parameters and test region geometries, are described in further detail below.

Upon selecting the test region geometry, the system 100 can arrange each instance of the test region geometry within a discrete test region that defines a subsection of the available build volume of the additive manufacturing device 101. Generally, the system 100 arranges test regions within the build volume based on whether the additive manufacturing device 101 can modulate the selected test variable on an interlayer basis or on an intralayer basis.

In one implementation, in response to accessing a selection of an exclusively interlayer test variable, the system 100 can arrange the set of test regions and corresponding test region geometry in a vertical stack such that each layer is characterized by a single value of the test variable. In this implementation, the system 100 can generate connective geometry between instances of the test region geometry positioned within buffer regions occupying intermediate layers between test regions in order to ensure that all sections of the test build remain adhered to the build platform while photocuring the test build. More specifically, the system 100 can generate a test file based on a selection of the test variable, the test file defining a set of test regions, each test region in the set of test regions characterized by a value of the test variable and defining a subset of layers of the first test file. Thus, the system 100 can generate a test file representing a test build for testing an interlayer test variable.

Additionally or alternatively, in response to accessing a selection of an intralayer test variable, the system 100 can generate a test file defining a two-dimensional (e.g., varying in the horizontal plane) or three-dimensional grid (e.g., varying in the horizontal and vertical planes) arrangement of test regions within the build volume. For intralayer test variables, the system 100 can also generate test files defining interlocking test regions in order to reduce wasted volume within the build volume and to maximize a number of test regions defined by the test file. More specifically, the system 100 can generate a test file based on the selection of an intralayer test variable, the test file defining a set of test regions, each test region in the set of test regions characterized by a value of the intralayer test variable and defining a two-dimensional intralayer area for each layer of the test file.

In one implementation, in response to accessing a selection of multiple test variables, one of which is an intralayer, the system 100 can generate a test file defining a set of test regions arranged in a three-dimensional grid pattern and characterized by a first intralayer test variable varying in a horizontal dimension and a second interlayer test variable varying in a vertical dimension.

In another implementation, the system 100 can, for each test region defined by the test file, modify the test region geometry to include a label (e.g., in the form of embossed or debossed lettering) indicating the value of the test variable characterizing the test region. Alternatively, the system 100 can, for each test region defined by the test file modify the test region geometry to include an identifying feature configured to engage a test fixture. Thus, the system 100 can generate test files that distinguish otherwise identical test region geometries from one another, thereby facilitating manual physical measurement of the material parameters.

In yet another implementation, the system 100 can select the discrete values of the test variables assigned to each test region of the test file based on an estimated target value or an estimated target range of the test variable for the material based on known chemical or physical properties of the material. The system 100 can then generate a set of discrete values corresponding to the set of test regions of the test file such that the values are distributed (e.g., normally distributed, evenly distributed) about the estimated target value of the test variable or over the estimated target range of the test variable. In response to identifying that a target value of a material parameter roughly corresponds to a particular value of the test variable or would result from a value of a test variable between two discrete values of the test variable selected for a first test build, the system 100 can generate a second test file with the same geometry but with a refined range of discrete values of the testing parameter. Thus, through successive iterations of a single test build, the system 100 can narrow a target range of the test variable that corresponds to a target range of the material parameter.

In yet another implementation, instead of generating a test file defining a set of discrete test regions, the system can continuously (on a per-layer or per-pixel basis) vary the set of test variables over the geometry of the test build. In this implementation, the system can generate a test file that defines a single test region with a continuously varying set of test variables in one or more dimensions. For example, the system can generate a test file that varies a first test variable in the set of test variables along a first horizontal dimension, a second test variable in the set of test variables along a second horizontal dimension, and a third test variable in the set of test variables in a vertical dimension.

10 Test Builds

Generally, upon generating a test file, the system 100 can cooperate with the additive manufacturing device 101 to photocure a test build based on the test file. More specifically, the system 100 can photocure a first test build based on the first test file according to the value of the first test variable characterizing each test region in the first set of test regions in Block S130; and, for subsequent test builds, the system 100 can photocure a second test build based on the second test file according to the value of the second test variable characterizing each test region in the second set of test regions and the first target value of the first test variable in Block S132. In particular, the system 100 can instruct the additive manufacturing device 101 to execute a series of build cycles based on the test file in order to manufacture the test builds from a material reservoir containing the material. Thus, the system 100 can generate a succession of test builds, each varying a distinct test variable and/or measuring a distinct material parameter. Examples of specific test build geometries are further described below.

11. Physical Measurements

Generally, the system 100 can access a set of physical measurements representing a value of the material parameter for each test region of a test build. More specifically, the system 100 can access a first set of physical measurements of a first test build, the first set of physical measurements representing a value of a first material parameter for each test region in the first set of test regions in Block S140; and, for a subsequent iteration of the iterative material development process, the system 100 can access a second set of physical measurements of a second test build, the second set of physical measurements representing a value of the second material parameter for each test region in the second set of test regions in Block S142. Thus, for each iteration of the iterative material development process, the system 100 can access a set of physical measurements representing values of the material parameter in response to variations in the test variables across the set of test regions in the test build. The particular physical measurements that correspond to particular build geometries are described in further detail below.

Generally, the set of physical measurements represent the selected set of material parameters in that each physical measurement in the set of physical measurements either directly corresponds to a value of a material parameter or that the system can calculate a value of a material parameter as a function of some subset of physical measurements in the set of physical measurements.

In one implementation, the system 100 accesses the set of physical measurements for a test build as manual input from the user (via the GUI or API associated with the system 100). In this implementation, the system 100 can receive a CSV or other text-based file indicating the physical measurement corresponding to each test region in the set of test regions. In another implementation, the system 100 accesses the set of physical measurements from a third-party measurement device or measurement fixture configured to communicate with the system 100 via a local or wide area network or via a direct I/O port connected to the system 100.

Alternatively, the system 100 can access the set of physical measurements via the sensor suite of the additive manufacturing device 101 prior to removal of the test build from the build chamber of the additive manufacturing device 101. For example, the system 100 can, at the additive manufacturing device 101, capture an image of the test build; and extract a set of physical measurements based on the image of the test build, the set of physical measurements representing the value of the material parameter for each test region in the first set of test regions. Thus, the system 100 can minimize the number of manual steps required from the user in order to progress from one iteration of the iterative material development process to the next.

In particular, the additive manufacturing device 101 can reference the known geometry of the test build and the known position of the set of image sensors and/or other optical sensors included within the additive manufacturing device 101 to estimate individual physical measurements of features of the test build by executing computer visual and remote sensing techniques. Additionally, the additive manufacturing system can utilize ultrasonic, multispectral, or depth sensor data to provide additional physical measurements of physical features of the test build.

12. Target Test Variable Range

Generally, upon accessing a set of physical measurements representing values of the material parameter of the test build, the system 100 can calculate a target range of the test variable that corresponds to a target range of the material parameter, thereby characterizing a build parameter for successful additive manufacturing using the material while also verifying whether the cured material exhibits target material properties. More specifically, the system 100 can calculate a first target range of the first test variable for the material based on the first set of physical measurements in Block S150; and, in a subsequent iteration of the iterative material development process, the system 100 can calculate a second target range of the second test variable for the material based on the second set of physical measurements in Block S152. Thus, the system 100 can calculate a target range of values of the test variable that corresponds to a target range of values of the material parameter, thereby characterizing the relationship between the test variable and the material parameter.

In one implementation, the system 100 can access a target value or range of values for the material parameter of a particular test build (e.g., input by a user via a GUI or API). Upon accessing the set of physical measurements representing values of the material parameter, the system 100 can then plot the represented values of the material parameter derived from the set of physical measurements against corresponding values of the test variable for each test region in the set of test regions. The system 100 can then execute linear or higher order regression techniques and/or other statistical techniques to characterize a function or statistical model relating the test variable to the material parameter and vice versa (e.g., the inverse of this function). The system 100 can then evaluate the derived function based on the target value or range of values of the material parameter to calculate a target value or range of values of the test variable for the material. If further precision is required (e.g., the target value or range of values of the material parameter lies in an interpolated or extrapolated region of the derived function), the system 100 can execute a second iteration of the test build with a narrower range of discrete values of the test variable, thereby providing higher resolution data to characterize an interpolated or extrapolated region of the derived function relating the test variable to the material parameter.

For multivariate test builds (e.g., test builds characterizing the relationship between a set of test variables and a set of material parameters), the system 100 can calculate a higher dimensional surface relating the set of test variables to the set of material parameters, thereby enabling characterization of more complex relationships between test variables and material parameters and between material parameters.

13. Example Test Files and Corresponding Test Builds

Each of the following sections describes additional details of particular test build geometries and associated test variables, material parameters, photocuring processes, and physical measurements.

13.1 Cure Characterization Test File

Figure 11:
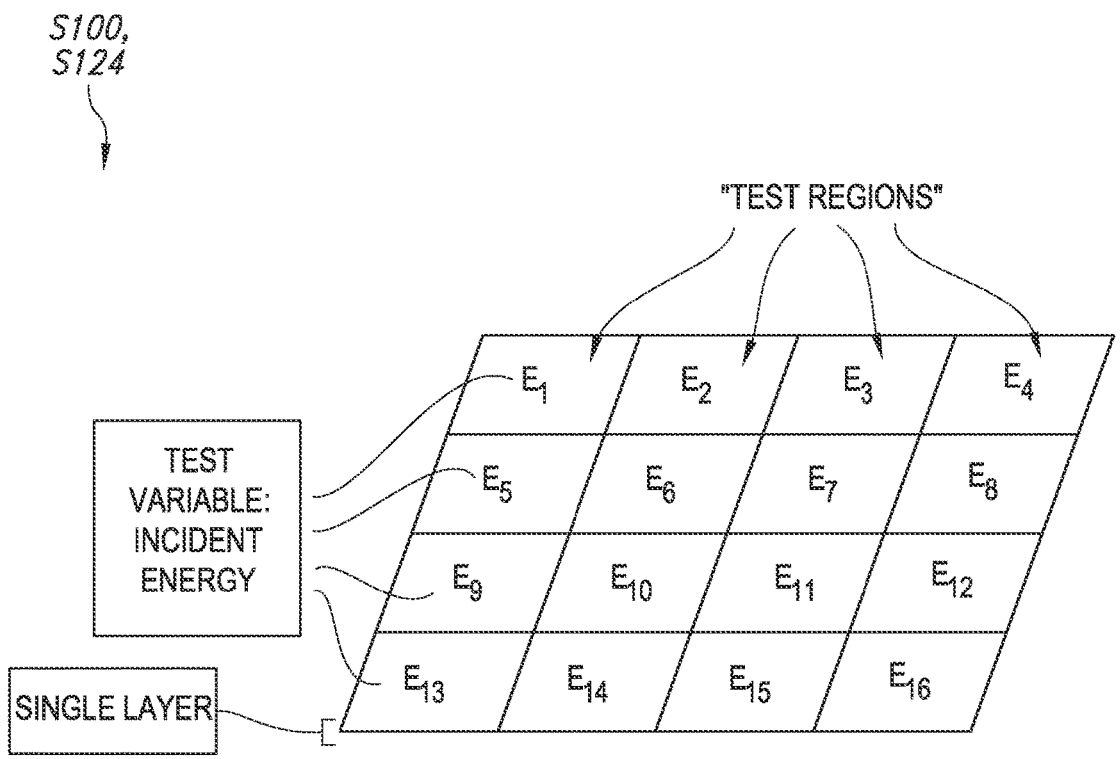
FIG. 11 is a flowchart representation of one variation of the method.

As shown in FIG. 11, in response to accessing a selection of exposure energy as a test variable and cure depth as a material parameter, the system 100 generates a cure characterization test file for the material based on an estimated critical energy of the material and a set of exposure durations within an acceptable operating range of the additive manufacturing device 101. More specifically, the system 100 can generate a cure characterization test file defining a set of test regions arranged across a build area, each test region in the set of test regions characterized by a total exposure energy value in Block S124. Thus, the system 100 can generate a cure characterization test file configured to provide examples of the cure depth over a range of exposure energy values. Because the exposure energy irradiated toward an test region of the material is equal to an exposure intensity multiplied by an exposure duration, when generating the cure characterization test file, the system 100 can hold either exposure intensity or exposure duration constant while varying the other parameter. For example, the system 100 can: generate a cure characterization test file comprising a single layer and defining a set of test regions, each characterized by an exposure duration in a range of exposure durations and one exposure intensity. Alternatively, the system 100 can generate a cure characterization test file comprising a single layer and defining a set of test regions, each characterized by an exposure intensity in a range of exposure intensities and one exposure duration.

The cure depth of most material chemistries is a logarithmic function of the form:

$$C_d = D_p \ln\left(\frac{E_{max}}{E_c}\right)$$

where $C_d$ is the cure depth, $D_p$ is the penetration depth parameter, $E_{max}$ is the energy incident to the material at the build interface, and $E_c$ is the critical energy at which measurable photocuring occurs in the material. Thus, the system 100 can generate a cure characterization test file defining a set of test regions characterized by exponentially increasing energy levels in order to obtain an accurate fit when calculating the working curve for the material. Alternatively, the system 100 can generate a cure characterization test file defining a set of test regions characterized by energy levels distributed within the operating range of the additive manufacturing device 101 in order to provide a more accurate fit within a range of energy levels that can be realistically produced by the additive manufacturing device 101 during the additive manufacturing process.

In one implementation, the system 100 generates a cure characterization test file defining a set of test regions characterized by a square or rectangular shape and arranged in a two-dimensional grid pattern across the build interface such that, upon photocuring a cure characterization test build corresponding to the cure characterization test file, the system 100 creates a contiguous layer despite differing cure depths within the same layer. Alternatively, the system 100 can generate a cure characterization test file defining a set of test regions separated by a buffer region in order to create more distinct divisions between test regions of the cure characterization test file and enabling easier identification and/or measurement of the test regions. In this alternative implementation, the system 100 can define a grid structure supporting the cure characterization test build resulting from the cure characterization test file. Additionally, the system 100 can specify that the grid structure of the cure characterization test file is characterized by the highest energy level in the set of energy levels characterizing the set of test regions. Thus, upon photocuring the cure characterization test file, the system 100 can ensure that the cure characterization test build results in a single piece instead of multiple, separate pieces.

Generally, the system 100 can generate the cure characterization test build according to the cure characterization test file in order to create a single layer of photocured material at various thicknesses corresponding to the set of energy levels assigned to each test region defined by the cure characterization test build. More specifically, the system 100 can photocure a cure characterization test build by, for each test region in the set of test regions of the cure characterization test file, selectively exposing the material to a quantity of exposure energy corresponding to the exposure energy value characterizing the test region in Block S134. More specifically, the system 100 can photocure a cure characterization test build by, for each test region in the set of test regions of the cure depth build file, selectively exposing a corresponding test region of the material at a build interface to the exposure energy characterizing the test region.

Because the purpose of the cure characterization test build is to determine the cure depth of the material when exposed to a range of energy levels, the system 100 can enable the thickness of the single layer to vary by retracting the build platform from the build window. Therefore, when the system 100 photocures the cure characterization test build, the single layer (of varying thickness) adheres directly to the build platform, enabling the system 100 to optically or mechanically measure the cure depth across the test regions of the cure characterization test build or enabling a user to perform these measurements. Alternatively, a user may peel the cure characterization test build from the build window in order to measure the cure depth across the various test regions of the cure characterization test build.

Upon photocuring the cure characterization test build, the system 100 can then access a set of physical measurements representing the thicknesses of the cure characterization test build (e.g., the depth of cure) within each test region and calculate the working curve for the material based on this set of physical measurements. More specifically, the system 100 can access a first set of physical measurements representing a depth of cure for each test region in the set of test regions in Block S144. In one implementation, the system 100 accesses a set of manually derived depth of cure measurements recorded by a user via a set of calipers. Alternatively, the system 100 can automatically extract the set of depth of cure measurements via a depth sensor integrated with the additive manufacturing device 101.

Upon accessing the set of depth of cure measurements, the system 100 can generate a working curve for the material based on these physical measurements of the cure characterization test build by fitting the depth of cure measurements with a logarithmic function (i.e., logarithmic regression) in order to determine a target exposure energy level corresponding to a target layer thickness for the additive manufacturing device 101. More specifically, the system 100 can calculate a working curve based on a first set of physical measurements of the cure characterization test build. In one implementation, the system 100 can automatically measure the depth of each test region of the cure characterization test build by utilizing optical distance measurement via an integrated camera or laser distance measurement via a laser measurement device positioned above the build window. Alternatively, a user may obtain these physical measurements and store the resulting data in a medium accessible to the system 100. The system 100 can then access these physical measurements in order to calculate the working curve for the material. In either case, the system 100 accesses the physical measurements as a series of two-dimensional data points indicating the depth of cure corresponding to a particular exposure energy level. The system 100 can then perform logarithmic least squares region in order to calculate the value of $D_p$ and $E_c$.

In one implementation, upon calculating the working curve for a material under test, the system 100 can utilize the working curve (e.g., the values of $D_p$ and $E_c$) to predict a target value of $E_{max}$ (i.e., a target exposure energy level) that results in a particular cure depth corresponding to a target layer thickness.

The system 100 can select this target layer thickness based on a designed or preferred resolution or build speed of the additive manufacturing device 101. Alternatively, the system 100 can receive a target layer thickness via input from the user. Upon selecting this target layer thickness, the system 100 can calculate the corresponding target exposure energy according to the calculated working curve equation. Alternatively, the system 100 can calculate a critical energy of the material (corresponding to a minimum layer thickness) based on the first set of physical measurements of the cure characterization test build and a target layer thickness in Block S154.

In this variation, the system 100 can execute a second test file to the cure characterization test file in order to characterize a relationship between a chosen material parameter and exposure energy profiles characterized by exposure energies greater than the target exposure energy of the material calculated based on the cure characterization test file. More specifically, the system 100 can: generate a second test file based on a selection of a material parameter and the target exposure energy of the material, the second test file defining a set of test regions, each test region in the set of test regions characterized by an exposure energy profile corresponding to a total exposure energy value greater than the target exposure energy of the material; and photocure the second test build by selectively exposing each test region in the set of test regions to an exposure energy profile based on the exposure energy profile of the test region. Thus, the system 100 can calculate a target exposure energy profile for the material based a second test build. The system 100 can select the particular test region geometry of the second test build based on a selected high-priority material parameter accessed from a development flow for the iterative material development process or via user input.

13.2 Shrinkage and Warpage Test Build

Figure 12:
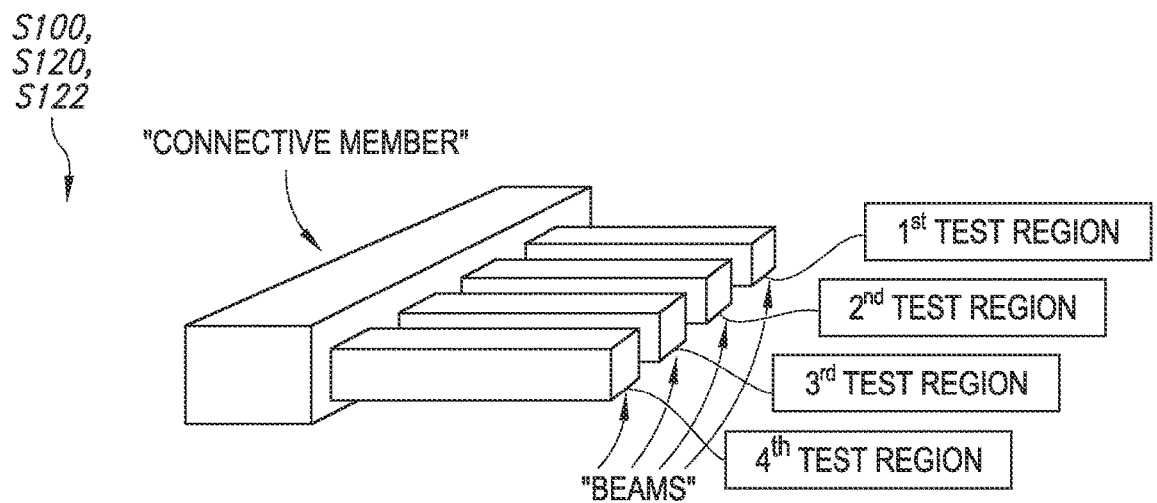
FIG. 12 is a flowchart representation of one variation of the method.

As shown in FIG. 12, the system 100 can generate a shrinkage and warpage test file (hereinafter "the shrinkage test file") as the second test file, in response to accessing a selection of shrinkage or warpage as a material parameter for the second test file. More specifically, the system 100 can access a selection of warpage compensation factor or interlayer shrinkage factor as the material parameter for the second test build; and, based on this selection, generate the second test file defining, for each test region in the set of test regions, a horizontal beam characterized by a target maximum deflection and a target length. Thus, by accessing physical measurements of the actual deflection and actual length of each beam of a corresponding shrinkage and warpage test build (hereinafter "the shrinkage test build"), the system 100 can calculate shrinkage and warpage factors corresponding to various exposure energy profiles. Alternatively, instead of a set of beams, the system can generate a test file defining a custom, application-specific test region geometry characterized by application-specific target dimensions. The system can then access physical measurements of these application-specific target dimensions and calculate compensation factors corresponding to these application-specific dimensions.

Generally, the system 100 generates a shrinkage test file in order to test the effects variation in the exposure energy profile (e.g., variations in exposure duration and/or exposure intensity at the same total exposure energy, variations in total exposure energy above the target exposure energy). In one implementation, the system 100 can generate a shrinkage test file comprising a set of three-dimensional beams horizontally arranged across the build area, each three-dimensional beam in the set of three-dimensional beams characterized by an exposure energy profile corresponding to a target exposure energy and a target layer thickness based on the working curve. Therefore, the system 100 can generate a shrinkage test file defining a set of beams, where each beam is characterized by a discrete exposure energy profile each exposure energy profile resulting in an exposure energy level greater than the target exposure energy (or a minimum exposure energy) according to the working curve equation. Additionally, the system 100 can generate a shrinkage test file including a connective member that forms a base from which each of the set of beams extends. Thus, each of the beams of the shrinkage test builds can extend from a common base structure.

The system 100 can generate a shrinkage test file defining a series of two-dimensional cross sections that further define a three-dimensional structure characterized by the aforementioned set of beams. Additionally, each two-dimensional cross section in the series of two-dimensional cross sections includes regions of the cross section specifying a particular exposure energy profile for that region, where each region corresponds to one of the beams in the set of beams.

The system 100 can generate a set of exposure energy profiles spanning (or partially spanning) an exposure duration operating range of the additive manufacturing device 101 and an exposure intensity operating range of the additive manufacturing device 101 respectively. The system 100 can generate a number of combinations corresponding to the desired number of beams. Additionally, the system 100 can receive a user preference for the number of beams included in the shrinkage test build and scale each of the beams based on the dimensions of the build area. Alternatively, the system 100 can receive a user preference for the dimensions of each beam (e.g., the length, width, and/or depth) and calculate a number of beams based on these dimensions and the dimensions of the build area.

Generally, the system 100 can photocure the shrinkage test build at the additive manufacturing device 101. More specifically, the system 100 can, for each test region in the set of test regions, photocure the horizontal beam for the test region via exposure to electromagnetic radiation according to the exposure energy profile characterizing the test region. Thus, the system 100 varies the exposure energy profile across various regions of the build area. Unlike the cure characterization test build, while photocuring the first layer of the shrinkage test build, the system 100 positions the build platform above the build window such that the first layer of the shrinkage test build adheres to the build platform, thereby enabling the additive manufacturing device 101 to position the shrinkage test build relative to the build window as the additive manufacturing device 101 photocures successive layers of the shrinkage test build.

Upon completion of the shrinkage test build, the system 100 can generate a second set of physical measurements characterizing each beam of the shrinkage test build. More specifically, the system 100 can, for each test region in the set of test regions, access a measured deflection of the horizontal beam; for each test region in the set of test regions, calculate a measured warpage factor based on the measured deflection of the horizontal beam; select a subset of satisfactory test regions based on the measured warpage factor for each test region in the set of test regions; and identify the exposure energy profile characterizing each test region in the subset of satisfactory test regions. Thus, the system 100 can calculate a target range of exposure energy profiles for the material that results in sufficiently low shrinkage and warpage, thereby enabling accurate additive manufacturing while utilizing the material.

In one implementation, the system 100 can access a second set of physical measurements can include a length shrinkage, a width shrinkage, and a depth shrinkage (e.g., expressed proportionally or as an absolute difference between the expected dimension and a measured dimension). Additionally or alternatively, the second set of physical measurements can include warpage angle (e.g., a deflection angle of the beam relative to the connective member of the shrinkage test build) or a warpage factor (e.g., a deflection of the beam relative to a length of the beam). In one implementation, the system 100 can execute a three-dimensional scan or optical analysis (via computer vision techniques) to extract the second set of physical measurements via the additive manufacturing device 101. Alternatively, a user may measure the second set of physical measurements and the system 100 can receive and/or access these physical measurements from a storage location or directly via a user interface.

Upon accessing the second set of physical measurements, the system 100 can select a target exposure energy profile that corresponds to a beam exhibiting the minimum shrinkage based on the second set of physical measurements. The system 100 can select the target combination based on this minimum shrinkage according to a dimension of interest (e.g., length, width, depth) or a combination score based on these dimensions and/or the warpage angle of each beam.

In one implementation, the system 100 can select a set of target combinations of target exposure durations and target exposure intensities, each of the set of target combinations exhibiting less than a threshold shrinkage based on the second set of physical measurements. Thus, the system 100 can select a set of target combinations that define an acceptable range of exposure durations and exposure intensities for the material.

13.3 Dimensional Accuracy Test Build

Figure 13:
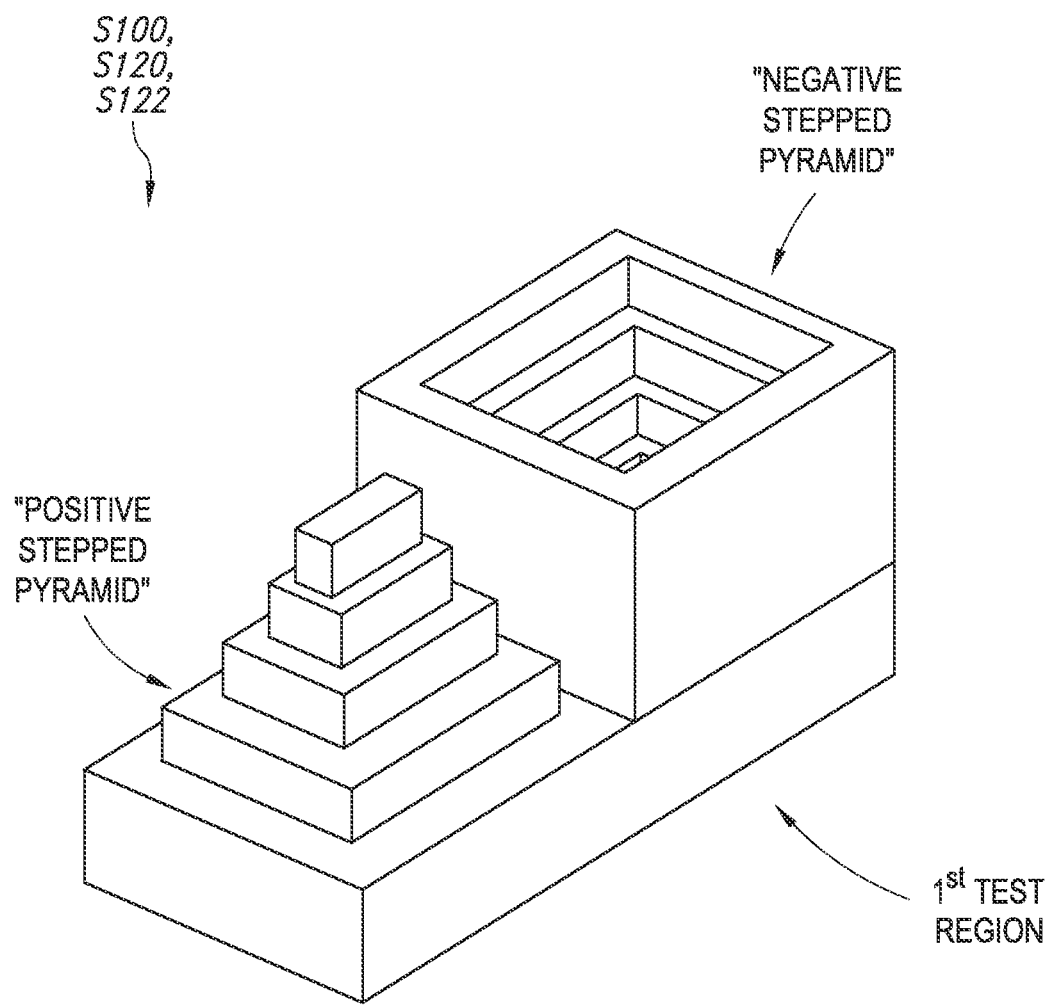
FIG. 13 is a flowchart representation of one variation of the method.

As shown in FIG. 13, the system 100 can generate a dimensional accuracy test build as a first or second test build in the iterative material development process based on a selection of a dimensional accuracy material parameter such as an intralayer scaling factor or an edge building characteristic. More specifically, based on a selection of an intralayer scaling factor (e.g., horizontal scaling factor) as the material parameter or based on a selection of an edge building characteristic as the material parameter, the system 100 can generate a test file defining, for each test region in the set of test regions: a positive stepped pyramid, each level of the positive stepped pyramid characterized by a positive target dimension; and a negative stepped pyramid, each level of the negative stepped pyramid characterized by a negative target dimension. Alternatively, based on selection of exposure energy profile as a test variable, the system 100 can generate a test file defining, for each test region in the set of test regions: a positive stepped pyramid, each level of the positive stepped pyramid characterized by a positive target dimension; and a negative stepped pyramid, each level of the negative stepped pyramid characterized by a negative target dimension. Thus, the system 100 utilizes the step pyramid test region geometry to provide a large number of opportunities for dimensional measurement within a small volume because each level of the positive and negative step pyramid is characterized by a target dimension in each of the two dimensions of the horizontal plane. Additionally, by including both a positive step pyramid and a negative step pyramid within the test region geometry the system 100 can compare the positive dimensional accuracy of the material to the negative dimensional accuracy of the material within the same test build.

Upon generating the dimensional accuracy test file, the system 100 can photocure a dimensional accuracy test build according to the dimensional accuracy test file. More specifically, the system 100 can, for each test region in the set of test regions: photocure the positive stepped pyramid according to the test variable value characterizing the test region; and photocure the negative stepped pyramid according to the test variable value characterizing the test region. Alternatively, in response to selection of exposure energy profile as the test variable, the system 100 can, for each test region in the set of test regions: photocure the positive stepped pyramid according to the test variable value characterizing the test region; and photocure the negative stepped pyramid according to the test variable value characterizing the test region.

After photocuring the dimensional accuracy test build, the system 100 can access a set of physical measurements for each test region (or test region in implementations in which exposure energy profile is selected as the test variable), where each physical measurement corresponds to a dimension of one step of the positive or negative stepped pyramid in the test region. More specifically, the system 100 can access, for each test region in the set of test regions: a set of positive measured dimensions corresponding to the positive target dimension of each level of the positive step pyramid; and a set of negative measured dimensions corresponding to the negative target dimension of each level of the negative step pyramid. Thus, for each stepped pyramid of the dimensional accuracy test build, the system 100 can execute a linear regression to estimate the intralayer scale factor and the edge building characteristic according to the following equations:

$$y'_+ = m_y p_y y_+ + k \text{ and}$$

$$y'_- = m_y p_y y_- - k$$

wherein $y'_+$ represents positive measured dimensions, $y_+$ represents positive target dimensions, $y'_-$ represents negative measured dimensions, $y_-$ represents negative target dimensions, $m_y$ represents the intralayer scale factor, $p_y$ represents the device-specific scale factor (e.g., a calibrated value characterizing the additive manufacturing device 101), and k represents the edge building characteristic of the material.

Therefore, the system 100 can generate a data pair of a target dimension and a measured dimension for each step of a stepped pyramid and fit the set of data pairs based on the above-described linear equations. Thus, the system 100 can characterize variations in the intralayer scale factor and the edge building characteristic relative to changes in a test variable.

In one implementation, the system 100 can calculate the intralayer scale factor for each test region of the dimensional accuracy test build while the test build is still in the green state. Alternatively, the system 100 can calculate the intralayer scale factor for each test region of the dimensional accuracy test build after post-curing of the test build, thereby accounting for additional intralayer shrinkage that may occur during the post-curing process for the material.

Once the system 100 has calculated an intralayer scale factor and/or an edge building characteristic for each test region of the dimensional accuracy test build, the system 100 can identify a target range of the test variable that corresponds to satisfactory values of these material parameters. For example, the system 100 can access a target intralayer scale factor and/or a target edge building characteristic based on the application of the material. Thus, the system 100 can calculate a target range of the test variable specific to an intended application of the material. More specifically, the system 100 can: for each test region in the set of test regions, calculate a measured intralayer scaling factor based on the set of positive measured dimensions for the test region and the set of negative measured dimensions for the test region; select a subset of satisfactory test regions based on the measured intralayer scaling factor for each test region in the set of test regions; and identify the target range of the test variables based on the value of the test variable characterizing each test region in the subset of satisfactory test regions. Additionally or alternatively, the system 100 can: for each test region in the set of test regions, calculate a measured edge building characteristic based on the set of positive measured dimensions for the test region and the set of negative measured dimensions for the test region; select a subset of satisfactory test regions based on the measured edge building characteristic for each test region in the set of test regions; and identify the target range of the test variables based on the value of the test variable characterizing each test region in the subset of satisfactory test regions. Thus, the system 100 can identify a target range of the test variable that corresponds to satisfactory compensation values for the material for use in a particular application.

13.4 Functional Property Test Builds

Figure 14:
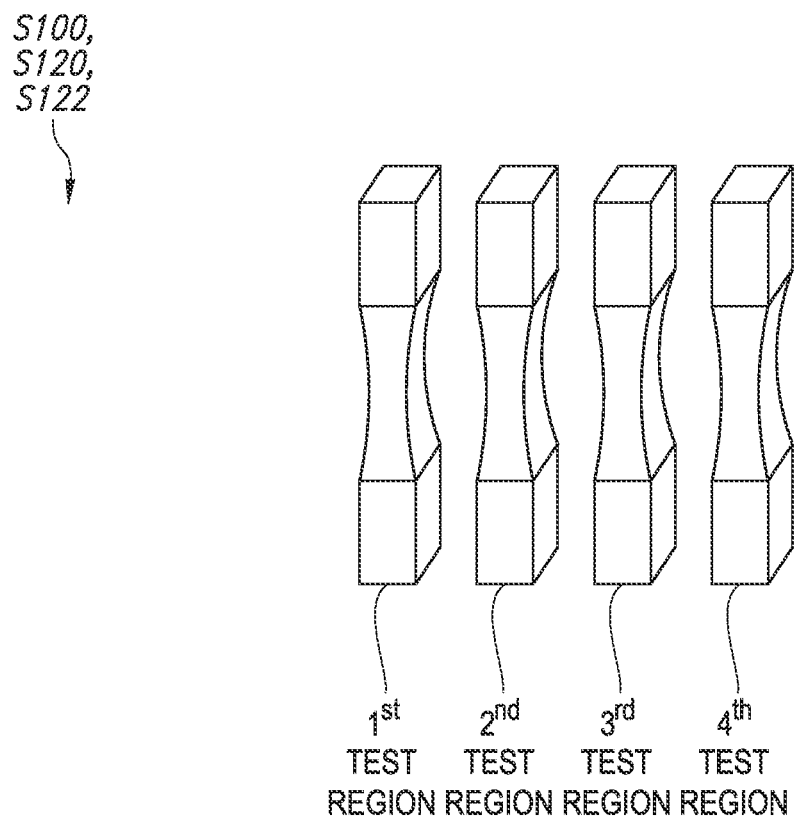
FIG. 14 is a flowchart representation of one variation of the method.

As shown in FIG. 14, the system 100 can generate a functional property test file and photocure a corresponding functional property test build in order to characterize the relationship between a test variable (such as exposure profile) and a selected mechanical property. The system 100 can generate functional property test files defining distinct test region geometries based on the particular material parameter selection. For example, based on a selection of a tensile mechanical property, such as ultimate tensile strength, elongation at break, and/or elastic modulus, the system 100 can generate a functional property test file with a test region geometry defining a gage-and-shoulder tensile test specimen (i.e., a dog-bone style tensile test specimen). In another example, based on a selection of a shear mechanical property, such as shear strength and/or shear modulus, the system 100 can generate a functional property test file with a test region geometry defining a V-notched beam specimen. In yet another example, based on a selection of a compressive mechanical property, such as characteristic strength, the system 100 can generate a functional property test file with a test region geometry defining a puck specimen for compression testing. In yet another example, based on a selection of a lattice mechanical property, the system 100 can generate a functional property test file with a test region geometry defining an application-specific lattice structure. Thus, in each example implementation, the system 100 can generate a functional property test file such that, upon photocuring a corresponding functional property test build, the section of the functional property test build within each test region can individually undergo a mechanical testing procedure. The set of physical measurements resulting from the mechanical testing procedure may then be input to the system 100 via the GUI or the API associated with the system 100.

More specifically, the system 100 can, based on a selection of a tensile mechanical property parameter: generate a test file defining, for each test region in the set of test regions, a gage-and-shoulder tensile test specimen; for each test region in the set of test regions, photocure the gage-and-shoulder tensile test specimen according to the value of the test variable characterizing the test region; for each test region in the set of test regions, access a measured tensile mechanical property of the gage-and-shoulder test specimen for the test region; select a subset of satisfactory test regions based on the measured tensile mechanical property of the gage-and-shoulder tensile test specimen for each test region in the set of test regions; and identify the target range of the test variable based on the value of the test variable characterizing each test region in the subset of satisfactory test regions. Similarly, the system 100 can execute a similar process based on the other above-described test region geometries and corresponding mechanical testing procedures.

In one implementation, the system can generate a functional property test file for each of a set of orientations in order to characterize the extent to which the functional properties of the material are isotropic. For example, the system can generate a set of functional property test builds defining, an X-Y orientation of the test region geometries, an X-Z orientation of the test region geometries, and a Z-Y orientation of the test region geometries, Thus, upon accessing physical measurements characterizing each of the above-described functional property test builds, the system can assess differences in functional properties based on orientation of the test region geometry.

13.5 Vertically Tiered Test Build

Figure 15:
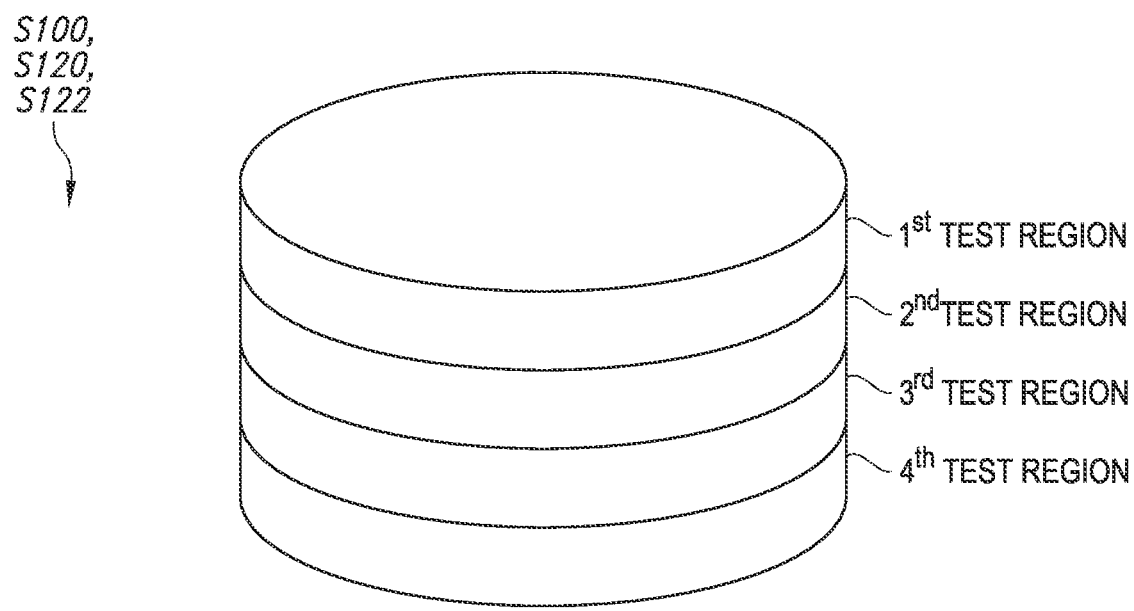
FIG. 15 is a flowchart representation of one variation of the method.

As shown in FIG. 15, the system 100 can generate a vertically tiered test file and photocure a corresponding vertically tiered test build defining a set of test regions, each of which defines horizontally oriented sections of a cylinder, column, or another prism geometry vertically stacked on one another. Generally, the system 100 can execute the vertically tiered test build in response to accessing a selection of an interlayer test variable (which can only vary relative to the vertical plane), such as bulk resin temperature, maximum inflation pressure, and/or maximum retraction force, exposure delay, advancement rate, or in response to a receiving selection of a material parameter such as surface roughness parameter or any other material parameter that can be easily characterized based on physical measurements of a cylindrical or columnar shape. However, the system can also test intralayer test variables via the vertically tiered test build.

More specifically, the system 100 can, in response to accessing a selection of a surface roughness parameter as the material parameter; based on the selection, generate a vertically tiered test file defining, for each test region in the set of test regions, a horizontal section of a contiguous column; and, for each test region in the set of test regions, photocure the horizontal section of the contiguous column for the test region according a value of the test variable characterizing the test region.

Upon photocuring the vertically tiered test build, the system 100 can access a set of physical measurements corresponding to a surface roughness parameter in order to characterize the effect of the test variable on the surface roughness of the cured material. More specifically, the system 100 can, for each test region in the set of test regions, access a measured surface roughness parameter of the horizontal section of the contiguous column. Once the system 100 has accessed the measured surface roughness parameter for each test region, the system 100 can: select a subset of satisfactory test regions based on the measured surface roughness parameter for each test region in the set of test regions; and identify the target range of the test variable based on the value of the test variable characterizing each test region in the subset of satisfactory test regions.

In one implementation, the system 100 can generate a vertically tiered test file defining a different cross-section (such as a square, rectangular, or other cross section), thereby defining a non-cylindrical column. Additionally, or alternatively, the system 100 can generate a vertically tiered test file with buffer regions between the test regions of the vertically tiered test file to more effectively isolate transition effects between values of the test variable applied to adjacent test regions.

13.6 Wall Thickness Test Build

Figure 16:
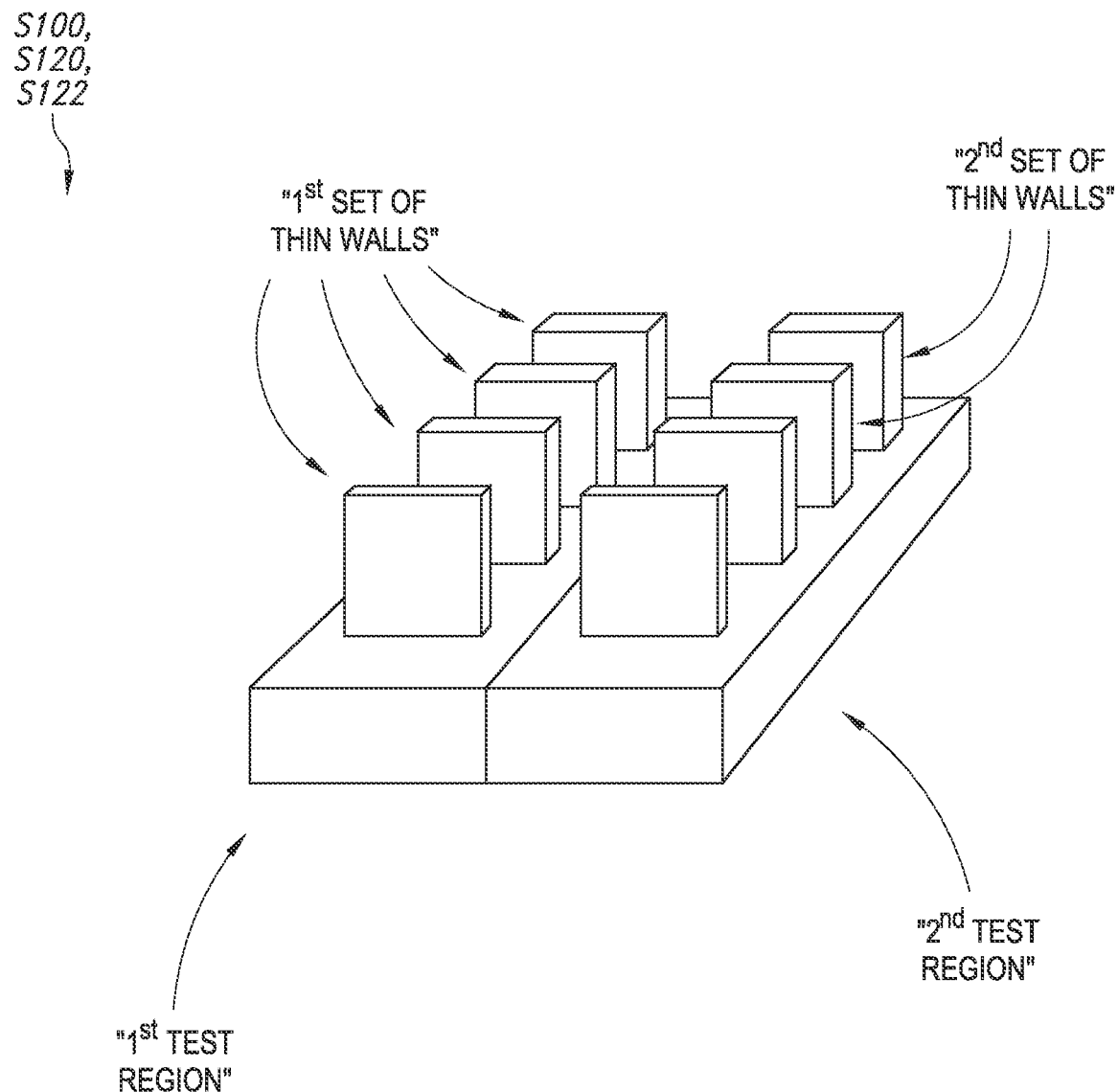
FIG. 16 is a flowchart representation of one variation of the method.

As shown in FIG. 16, the system 100 can generate a wall thickness test file and photocure a corresponding wall thickness test build in order to characterize a minimum wall thickness parameter of the material at various values of a test variable (such as exposure energy profile). Generally, the system 100 can generate a wall thickness test file that defines a test region geometry including a set of thin walls extending from a base component, each thin wall characterized by a target thickness. Thus, by measuring the resulting wall thickness test build to determine the thinnest wall which was successfully photocured by the additive manufacturing device 101, the system 100 can characterize the relationship between the test variable and the minimum wall thickness of the material.

More specifically, the system 100 can, based on a selection of a minimum wall thickness parameter as the material parameter: generate a wall thickness test file defining, for each test region in the set of test regions, a set of vertical walls extending from a base section, each vertical wall defining a target thickness value; and, for each test region in the set of test regions, photocure the set of vertical walls according to the value of the test variable characterizing the test region.

Upon completion, the system 100, can access a physical measurement indicating the minimum wall thickness successfully photocured within each test region of the wall thickness test build. More specifically, the system 100 can, for each test region in the set of test regions, access a measured minimum wall thickness in the set of vertical walls. In one implementation, the system 100 can automatically extract the measured minimum wall thickness for each test region in the set of test regions via the sensor suite of the additive manufacturing device 101 (e.g., by detecting the presence and/or absence of vertical walls in the set of vertical walls and referencing the corresponding target wall thicknesses and positions of each vertical wall in the set of vertical walls). Alternatively, a user may input the minimum wall thickness observed via the GUI or the API associated with the system 100.

Upon accessing a minimum wall thickness for each test region in the set of test regions, the system 100 can identify the corresponding range of values of the test variable that correspond to a satisfactory minimum wall thickness. More specifically, the system 100 can: select a subset of satisfactory test regions based on the measured minimum wall thickness for each test region in the set of test regions; and identify the target range of the test variable based on the value of the test variable characterizing each test region in the subset of satisfactory test regions.

13.7 Feature Specific Test Builds

Figure 17A:
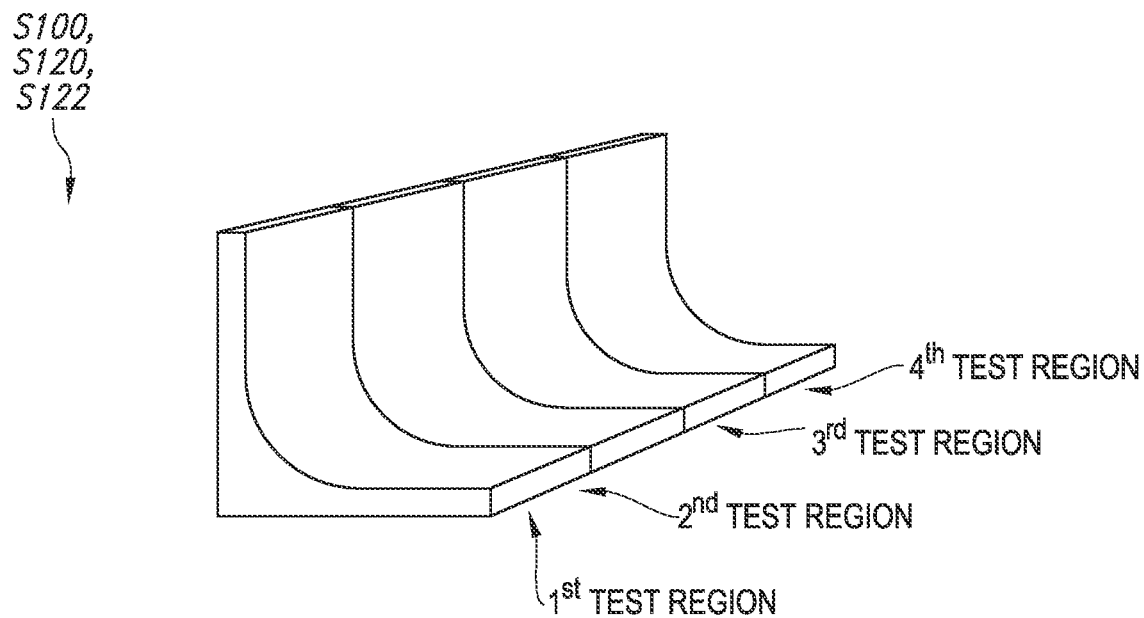
FIG. 17A is a flowchart representation of one variation of the method.
Figure 17B:
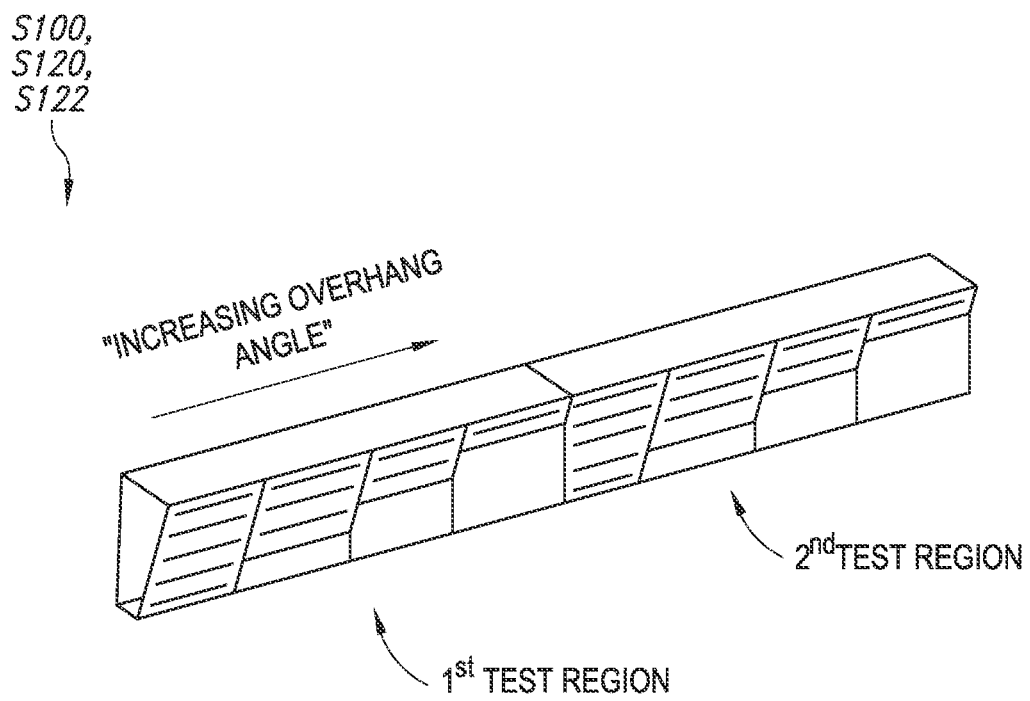
FIG. 17B is a flowchart representation of one variation of the method.

As shown in FIGS. 17A and 17B, the system 100 can generate a feature specific test file and photocure a corresponding feature specific test build in order to characterize the accuracy with which the additive manufacturing device 101 can photocure specific features (e.g., overhangs of various overhang angles, through holes, embossed or debossed text) corresponding to values of a selected test variable. Generally, the system 100 can generate a feature specific test file based on selection and/or input of a specific feature as a material parameter for an iteration of the iterative material development process. For example, the system 100 can receive (via the GUI or the API associated with the system 100) a three-dimensional file defining the geometry of an application-specific feature. The system 100 can then generate a feature specific test file based on the receive application-specific feature geometry. Thus, the system 100 can identify a target range of a test variable (such as exposure energy profile) that results in the most defined features for a known application of the material.

In one implementation, the system 100 can generate a quarter pipe test file that defines a quarter pipe geometry as the test region geometry. Generally, the quarter pipe test file can be utilized to test layer definition and surface finish of the photocured material at different surface orientations.

In another implementation, the system 100 can generate a maximum overhang test file as the supplementary test file with a test region geometry defining a series of increasing overhang angles based on access a selection of a maximum overhang parameter as a material parameter. More specifically, the system 100 can, based on selection of a maximum overhang angle parameter: generate a test file defining, for each test region in the set of test regions, a series of overhangs, each overhang in the series of overhangs characterized by an increasing overhang angle relative a previous overhang in the series of overhangs; for each test region in the set of test regions, photocure the series of overhangs according to the value of the test variable characterizing the test region; for each test region in the set of test regions, access a measured maximum overhang angle in the series of overhang angles for the test region; select a subset of satisfactory test regions based on the measured maximum overhang angle for each test region in the set of test regions; and identify a target range of the test variable based on the value of the test variable characterizing each test region in the subset of satisfactory test regions.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for evaluating a material for an additive manufacturing process comprising:
   generating a cure characterization test file defining a set of test regions arranged across a build area, each test region in the set of test regions characterized by a total exposure energy value;
   photocuring a cure characterization test build by, for each test region in the set of test regions of the cure characterization test file, selectively exposing the material to a quantity of exposure energy corresponding to the total exposure energy value characterizing the test region;

accessing a first set of physical measurements representing a depth of cure for each test region in the set of test regions;

calculating a working curve of the material based on the first set of physical measurements;

receiving a first selection of a first material parameter comprising an intralayer scaling factor;

generating a second test file based on the first selection and the working curve of the material, the second test file defining a set of test regions, each test region in the set of test regions:
  characterized by an exposure intensity value and an exposure duration value corresponding to a total exposure energy value greater than a target exposure energy of the material;
  defining a positive stepped pyramid, each level of the positive stepped pyramid characterized by a positive target dimension; and
  defining a negative stepped pyramid, each level of the negative stepped pyramid characterized by a negative target dimension;

photocuring a second test build based on the second test file by, for each test region in the set of test regions:
  photocuring volumes of the material via exposure to electromagnetic radiation, according to the exposure intensity value and the exposure duration value characterizing the test region, to form a positive stepped pyramid of the test region; and
  photocuring volumes of the material via exposure to electromagnetic radiation, according to the exposure intensity value and the exposure duration value characterizing the test region, to form a negative stepped pyramid of the test region;

accessing a second set of physical measurements of the second test build, the second set of physical measurements representing, for each test region in the set of test regions:
  a set of positive measured dimensions corresponding to positive target dimensions of levels of a positive step pyramid of the test region; and
  a set of negative measured dimensions corresponding to negative target dimensions of levels of a negative step pyramid of the test region;

for each test region in the set of test regions, calculating a measured intralayer scaling factor based on the set of positive measured dimensions for the test region and the set of negative measured dimensions for the test region;

selecting a subset of satisfactory test regions based on the measured intralayer scaling factor for each test region in the set of test regions; and calculating an exposure intensity range for the material based on the the exposure intensity value characterizing each test region in the subset of satisfactory test regions.

2. The method of claim 1:
wherein receiving the first selection comprises receiving the first selection of the first material parameter comprising the intralayer scaling factor and a second material parameter comprising a warpage factor;
wherein generating the second test file comprises generating the second test file based on the first selection and the working curve of the material, the second test file defining a second set of test regions, each test region in the second set of test regions:
  characterized by an exposure intensity value and an exposure duration value corresponding to a total exposure energy value greater than a target exposure energy of the material; and
  defining a horizontal beam characterized by a target deflection;
wherein photocuring the second test build comprises photocuring the second test build based on the second test file by, for each test region in the second set of test regions, photocuring the horizontal beam for the test region via exposure to electromagnetic radiation according to the exposure intensity value and the exposure duration value characterizing the test region;
wherein accessing the second set of physical measurements of the second test build comprises accessing the second set of physical measurements of the second test build, the second set of physical measurements representing, for each test region in the second set of test regions, a measured deflection of the horizontal beam;
further comprising, for each test region in the second set of test regions, calculating a measured warpage factor based on the measured deflection of the horizontal beam; and
wherein selecting the subset of satisfactory test regions comprises selecting the subset of satisfactory test regions based on the measured intralayer scaling factor for each test region in the set of test regions and the measured warpage factor for each test region in the second set of test regions.

3. The method of claim 1:
wherein receiving the first selection comprises receiving the first selection of the first material parameter comprising the intralayer scaling factor and a second material parameter comprising a maximum overhang angle parameter;
wherein generating the second test file comprises generating the second test file based on the first selection and the working curve of the material, the second test file defining a second set of test regions, each test region in the second set of test regions:
  characterized by an exposure intensity value and an exposure duration value corresponding to a total exposure energy value greater than a target exposure energy of the material; and
  defining a series of overhangs, each overhang in the series of overhangs characterized by an increasing overhang angle relative a previous overhang in the series of overhangs;
wherein photocuring the second test build comprises photocuring the second test build based on the second test file by, for each test region in the second set of test regions, photocuring the series of overhangs via exposure to electromagnetic radiation according to the exposure intensity value and the exposure duration value characterizing the test region;
wherein accessing the second set of physical measurements of the second test build comprises accessing the second set of physical measurements of the second test build, the second set of physical measurements representing, for each test region in the second set of test regions, a measured maximum overhang angle in the series of overhang angles for the test region; and
wherein selecting the subset of satisfactory test regions comprises selecting the subset of satisfactory test regions based on the measured intralayer scaling factor for each test region in the set of test regions and the measured maximum overhang angle for each test region in the second set of test regions.

4. A method for evaluating a material for an additive manufacturing process comprising:
   generating a cure characterization test file defining a set of test regions arranged across a build area, each test region in the set of test regions characterized by a total exposure energy value;
   photocuring a cure characterization test build by, for each test region in the set of test regions of the cure characterization test file, selectively exposing the material to a quantity of exposure energy corresponding to the total exposure energy value characterizing the test region;
   accessing a first set of physical measurements representing a depth of cure for each test region in the set of test regions;
   calculating a working curve of the material based on the first set of physical measurements;
   receiving a first selection of a first material parameter comprising an edge building characteristic;
   generating a second test file based on the first selection and the working curve of the material, the second test file defining a set of test regions, each test region in the set of test regions:
      characterized by an exposure intensity value and an exposure duration value corresponding to a total exposure energy value greater than a target exposure energy of the material;
      defining a positive stepped pyramid, each level of the positive stepped pyramid characterized by a positive target dimension; and
      defining a negative stepped pyramid, each level of the negative stepped pyramid characterized by a negative target dimension;
   photocuring a second test build based on the second test file by, for each test region in the set of test regions:
      photocuring volumes of the material via exposure to electromagnetic radiation according to the exposure intensity value and the exposure duration value characterizing the test region, to form a positive stepped pyramid of the test region; and
      photocuring volumes of the material via exposure to electromagnetic radiation according to the exposure intensity value and the exposure duration value characterizing the test region, to form a negative stepped pyramid of the test region;
   accessing a second set of physical measurements of the second test build, the second set of physical measurements representing, for each test region in the set of test regions:
      a set of positive measured dimensions corresponding to positive target dimensions of levels of a positive step pyramid of the test region; and
      a set of negative measured dimensions corresponding to negative target dimensions of levels of a negative step pyramid of the test region;
   for each test region in the set of test regions, calculating a measured edge building characteristic based on the set of positive measured dimensions for the test region and the set of negative measured dimensions for the test region;
   selecting a subset of satisfactory test regions based on the measured edge building characteristic for each test region in the set of test regions; and
   calculating an exposure intensity range for the material based on the exposure intensity value characterizing each test region in the subset of satisfactory test regions.

5. A method for evaluating a material for an additive manufacturing process comprising:
   generating a cure characterization test file defining a set of test regions arranged across a build area, each test region in the set of test regions characterized by a total exposure energy value;
   photocuring a cure characterization test build by, for each test region in the set of test regions of the cure characterization test file, selectively exposing the material to a quantity of exposure energy corresponding to the total exposure energy value characterizing the test region;
   accessing a first set of physical measurements representing a depth of cure for each test region in the set of test regions;
   calculating a working curve of the material based on the first set of physical measurements;
   receiving a first selection of a first material parameter comprising a warpage factor;
   generating a second test file based on the first selection and the working curve of the material, the second test file defining a set of test regions, each test region in the set of test regions:
      characterized by an exposure intensity value and an exposure duration value corresponding to a total exposure energy value greater than a target exposure energy of the material; and
      defining a horizontal beam characterized by a target deflection;
   photocuring a second test build based on the second test file by, for each test region in the set of test regions, photocuring the horizontal beam for the test region via exposure to electromagnetic radiation according to the exposure intensity value and the exposure duration value characterizing the test region;
   accessing a second set of physical measurements of the second test build, the second set of physical measurements representing, for each test region in the set of test regions, a measured deflection of the horizontal beam;
   for each test region in the set of test regions, calculating a measured warpage factor based on the measured deflection of the horizontal beam;
   selecting a subset of satisfactory test regions based on the measured warpage factor for each test region in the set of test regions; and
   calculating an exposure intensity range for the material based on the exposure intensity value characterizing each test region in the subset of satisfactory test regions.

6. The method of claim 5:
   wherein receiving the first selection comprises receiving the first selection of the first material parameter comprising the warpage factor and a second material parameter comprising a maximum overhang angle parameter;
   wherein generating the second test file comprises generating the second test file based on the first selection and the working curve of the material, the second test file defining a second set of test regions, each test region in the second set of test regions:
      characterized by an exposure intensity value and an exposure duration value corresponding to a total exposure energy value greater than a target exposure energy of the material; and defining a series of overhangs, each overhang in the series of overhangs characterized by an increasing overhang angle relative a previous overhang in the series of overhangs;

wherein photocuring the second test build comprises photocuring the second test build based on the second test file by, for each test region in the second set of test regions, photocuring the series of overhangs via exposure to electromagnetic radiation according to the exposure intensity value and the exposure duration value characterizing the test region;

wherein accessing the second set of physical measurements of the second test build comprises accessing the second set of physical measurements of the second test build, the second set of physical measurements representing, for each test region in the second set of test regions, a measured maximum overhang angle in the series of overhang angles for the test region; and wherein selecting the subset of satisfactory test regions comprises selecting the subset of satisfactory test regions based on the measured warpage factor for each test region in the set of test regions and the measured maximum overhang angle for each test region in the second set of test regions.

7. A method for evaluating a material for an additive manufacturing process comprising:

generating a cure characterization test file defining a set of test regions arranged across a build area, each test region in the set of test regions characterized by a total exposure energy value;

photocuring a cure characterization test build by, for each test region in the set of test regions of the cure characterization test file, selectively exposing the material to a quantity of exposure energy corresponding to the total exposure energy value characterizing the test region;

accessing a first set of physical measurements representing a depth of cure for each test region in the set of test regions;

calculating a working curve of the material based on the first set of physical measurements;

receiving a first selection of a first material parameter comprising a surface roughness parameter;

generating a second test file based on the first selection and the working curve of the material, the second test file defining a set of test regions, each test region in the set of test regions:

characterized by an exposure intensity value and an exposure duration value corresponding to a total exposure energy value greater than a target exposure energy of the material; and defining a horizontal section of a contiguous column;

photocuring a second test build based on the second test file by, for each test region in the set of test regions, photocuring the horizontal section of the contiguous column for the test region via exposure to electromagnetic radiation according to the exposure intensity value and the exposure duration value characterizing the test region;

accessing a second set of physical measurements of the second test build, the second set of physical measurements representing, for each test region in the set of test regions, a measured surface roughness parameter of the horizontal section of the contiguous column;

selecting a subset of satisfactory test regions based on the measured surface roughness parameter for each test region in the set of test regions; and calculating an exposure intensity range for the material based on the exposure intensity value characterizing each test region in the subset of satisfactory test regions.

8. A method for evaluating a material for an additive manufacturing process comprising:

generating a cure characterization test file defining a set of test regions arranged across a build area, each test region in the set of test regions characterized by a total exposure energy value;

photocuring a cure characterization test build by, for each test region in the set of test regions of the cure characterization test file, selectively exposing the material to a quantity of exposure energy corresponding to the total exposure energy value characterizing the test region;

accessing a first set of physical measurements representing a depth of cure for each test region in the set of test regions;

calculating a working curve of the material based on the first set of physical measurements;

receiving a first selection of a first material parameter comprising a surface roughness parameter;

generating a second test file based on the first selection and the working curve of the material, the second test file defining a set of test regions, each test region in the set of test regions:

characterized by an exposure intensity value and an exposure duration value corresponding to a total exposure energy value greater than a target exposure energy of the material; and defining a set of vertical walls extending from a base section, each vertical wall defining a target thickness value;

photocuring a second test build based on the second test file by, for each test region in the set of test regions, photocuring the set of vertical walls via exposure to electromagnetic radiation according to the exposure intensity value and the exposure duration value characterizing the test region;

accessing a second set of physical measurements of the second test build, the second set of physical measurements representing, for each test region in the set of test regions, a measured minimum wall thickness in the set of vertical walls;

selecting a subset of satisfactory test regions based on the measured minimum wall thickness for each test region in the set of test regions; and calculating an exposure intensity range for the material based on the exposure intensity value characterizing each test region in the subset of satisfactory test regions.

9. The method of claim 8:

wherein generating the second test file comprises generating the second test file based on the first selection and the working curve of the material, the second test file defining a second set of test regions, each test region in the second set of test regions:

characterized by an exposure intensity value and an exposure duration value corresponding to a total exposure energy value greater than a target exposure energy of the material; and defining a horizontal section of a contiguous column;

wherein photocuring the second test build comprises photocuring the second test build based on the second test file by, for each test region in the second set of test regions, photocuring the horizontal section of the contiguous column for the test region via exposure to electromagnetic radiation according to the exposure intensity value and the exposure duration value characterizing the test region;

wherein accessing the second set of physical measurements of the second test build comprises accessing the second set of physical measurements of the second test build, the second set of physical measurements representing, for each test region in the second set of test regions, a measured surface roughness parameter of the horizontal section of the contiguous column; and wherein selecting the subset of satisfactory test regions comprises selecting the subset of satisfactory test regions based on the measured minimum wall thickness for each test region in the set of test regions and the measured surface roughness parameter for each test region in the second set of test regions.

10. A method for evaluating a material for an additive manufacturing process comprising:

generating a cure characterization test file defining a set of test regions arranged across a build area, each test region in the set of test regions characterized by a total exposure energy value;

photocuring a cure characterization test build by, for each test region in the set of test regions of the cure characterization test file, selectively exposing the material to a quantity of exposure energy corresponding to the total exposure energy value characterizing the test region;

accessing a first set of physical measurements representing a depth of cure for each test region in the set of test regions;

calculating a working curve of the material based on the first set of physical measurements;

receiving a first selection of a first material parameter comprising a tensile mechanical property;

generating a second test file based on the first selection and the working curve of the material, the second test file defining a set of test regions, each test region in the set of test regions:

characterized by an exposure intensity value and an exposure duration value corresponding to a total exposure energy value greater than a target exposure energy of the material; and defining a gage-and-shoulder tensile test specimen;

photocuring a second test build based on the second test file by, for each test region in the set of test regions, photocuring the gage-and-shoulder tensile test specimen via exposure to electromagnetic radiation according to the exposure intensity value and the exposure duration value characterizing the test region;

accessing a second set of physical measurements of the second test build, the second set of physical measurements representing, for each test region in the set of test regions, a measured tensile mechanical property of the gage-and-shoulder test specimen for the test region;

selecting a subset of satisfactory test regions based on the measured tensile mechanical property of the gage-and-shoulder tensile specimen for each test region in the set of test regions; and calculating an exposure intensity range for the material based on the exposure intensity value characterizing each test region in the subset of satisfactory test regions.

11. The method of claim 10:

wherein receiving the first selection comprises receiving the first selection of the first material parameter comprising the tensile mechanical property and a second material parameter comprising a surface roughness parameter;

wherein generating the second test file comprises generating the second test file based on the first selection and the working curve of the material, the second test file defining a second set of test regions, each test region in the second set of test regions:

characterized by an exposure intensity value and an exposure duration value corresponding to a total exposure energy value greater than a target exposure energy of the material; and defining a horizontal section of a contiguous column;

wherein photocuring the second test build comprises photocuring the second test build based on the second test file by, for each test region in the second set of test regions, photocuring the horizontal section of the contiguous column for the test region via exposure to electromagnetic radiation according to the exposure intensity value and the exposure duration value characterizing the test region;

wherein accessing the second set of physical measurements of the second test build comprises accessing the second set of physical measurements of the second test build, the second set of physical measurements representing, for each test region in the second set of test regions, a measured surface roughness parameter of the horizontal section of the contiguous column; and wherein selecting the subset of satisfactory test regions comprises selecting the subset of satisfactory test regions based on the measured tensile mechanical property of the gage-and-shoulder tensile specimen for each test region in the set of test regions and the measured surface roughness parameter for each test region in the second set of test regions.

12. A method for evaluating a material for an additive manufacturing process comprising:

generating a cure characterization test file defining a set of test regions arranged across a build area, each test region in the set of test regions characterized by a total exposure energy value;

photocuring a cure characterization test build by, for each test region in the set of test regions of the cure characterization test file, selectively exposing the material to a quantity of exposure energy corresponding to the total exposure energy value characterizing the test region;

accessing a first set of physical measurements representing a depth of cure for each test region in the set of test regions;

calculating a working curve of the material based on the first set of physical measurements;

receiving a first selection of a first material parameter comprising a maximum overhang angle parameter;

generating a second test file based on the first selection and the working curve of the material, the second test file defining a set of test regions, each test region in the set of test regions:

characterized by an exposure intensity value and an exposure duration value corresponding to a total exposure energy value greater than a target exposure energy of the material; and defining a series of overhangs, each overhang in the series of overhangs characterized by an increasing overhang angle relative a previous overhang in the series of overhangs;

photocuring a second test build based on the second test file by, for each test region in the set of test regions, photocuring the series of overhangs via exposure to electromagnetic radiation according to the exposure intensity value and the exposure duration value characterizing the test region;

accessing a second set of physical measurements of the second test build, the second set of physical measurements representing, for each test region in the set of test regions, a measured maximum overhang angle in the series of overhang angles for the test region;

selecting a subset of satisfactory test regions based on the measured maximum overhang angle for each test region in the set of test regions; and calculating an exposure intensity range for the material based on the exposure intensity value characterizing each test region in the subset of satisfactory test regions.

* * * * *